(12) United States Patent
Kawabe

(10) Patent No.: US 11,462,240 B2
(45) Date of Patent: Oct. 4, 2022

(54) MAGNETIC DISK DEVICE AND READ PROCESSING METHOD

(71) Applicants: Kabushiki Kaisha Toshiba, Tokyo (JP); Toshiba Electronic Devices & Storage Corporation, Tokyo (JP)

(72) Inventor: Takayuki Kawabe, Sagamihara Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/183,932

(22) Filed: Feb. 24, 2021

(65) Prior Publication Data

US 2022/0084549 A1    Mar. 17, 2022

(30) Foreign Application Priority Data

Sep. 14, 2020    (JP) .............................. JP2020-153965

(51) Int. Cl.
   *G11B 5/596*    (2006.01)

(52) U.S. Cl.
   CPC ...... *G11B 5/59694* (2013.01); *G11B 5/59627* (2013.01)

(58) Field of Classification Search
   CPC ..................................................... G11B 5/596
   See application file for complete search history.

(56) References Cited

U.S. PATENT DOCUMENTS

| | | | |
|---|---|---|---|
| 6,157,510 A * | 12/2000 | Schreck | B82Y 10/00 |
| 6,721,122 B2 | 4/2004 | Aikawa et al. | |
| 7,751,143 B2 * | 7/2010 | Yamamoto | G11B 5/5582 360/77.02 |
| 7,808,739 B2 | 10/2010 | Takasaki et al. | |
| 8,300,350 B2 | 10/2012 | Kawabe | |
| 9,093,119 B1 * | 7/2015 | Hwang | G11B 20/20 |
| 9,257,135 B2 * | 2/2016 | Ong | G11B 20/10009 |
| 9,437,232 B1 * | 9/2016 | Galbraith | G11B 5/59627 |
| 2012/0081810 A1 | 4/2012 | Kawabe | |

FOREIGN PATENT DOCUMENTS

| | | |
|---|---|---|
| JP | H8-321149 A | 12/1996 |
| JP | H10-149611 A | 6/1998 |
| JP | H11-149611 A | 6/1999 |
| JP | 3208615 B2 | 9/2001 |

* cited by examiner

*Primary Examiner* — K. Wong
(74) *Attorney, Agent, or Firm* — Allen & Overy LLP

(57) ABSTRACT

According to one embodiment, a magnetic disk device includes a disk, a head that has a write head that writes data to the disk and a read head that reads data from the disk, and a controller that changes an offset amount during read processing according to a vibration applied by a disturbance.

20 Claims, 17 Drawing Sheets

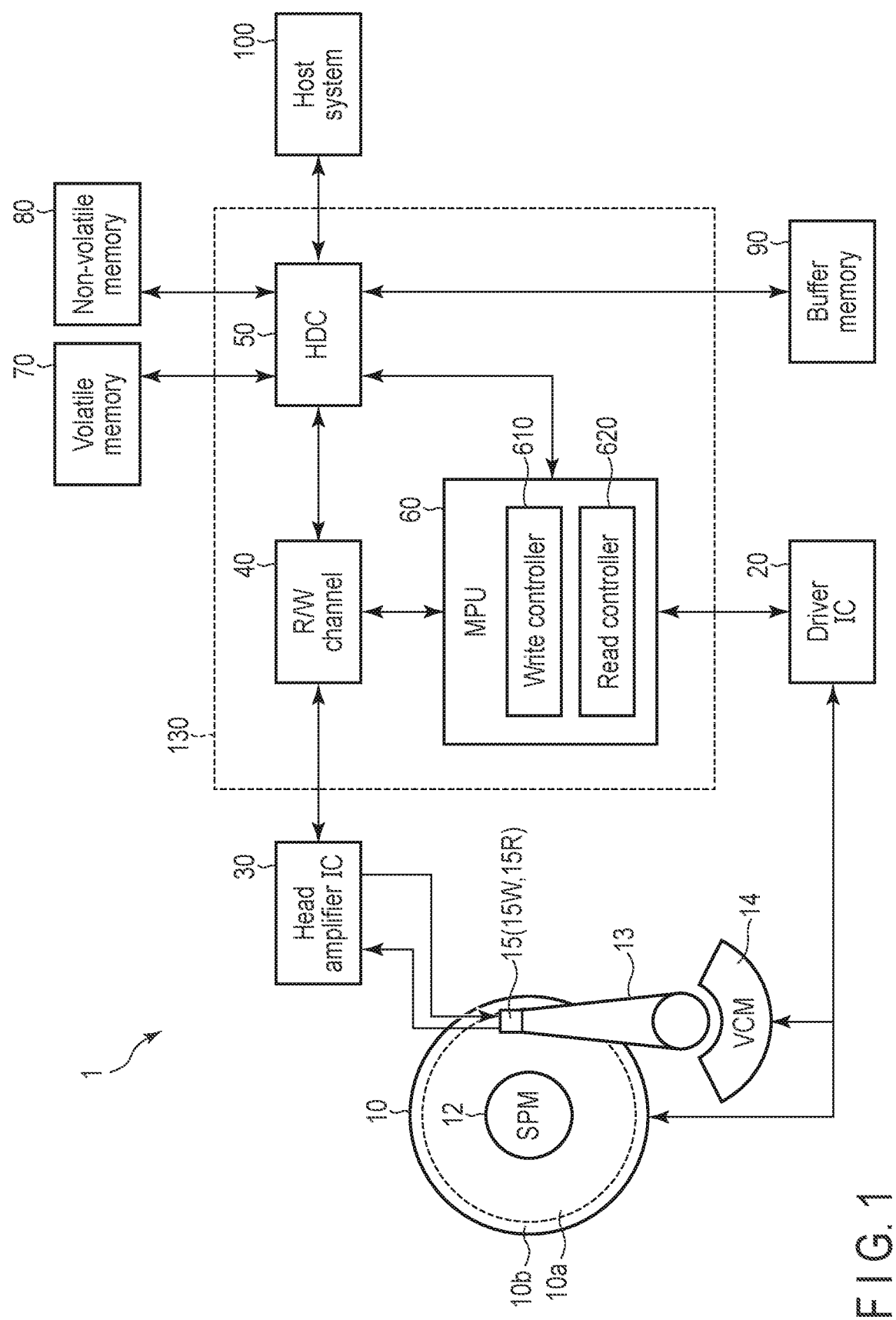
F I G. 1

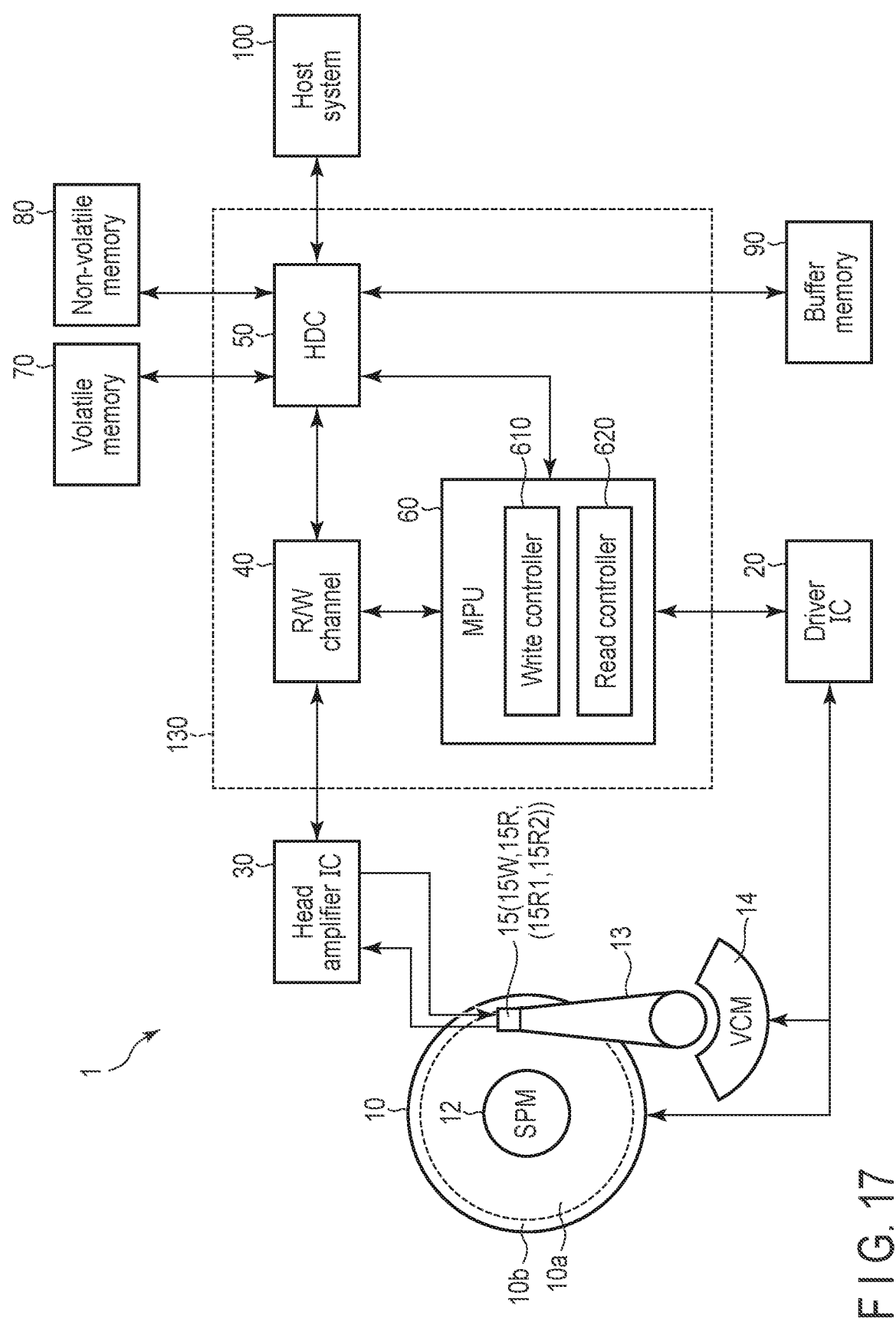
F I G. 17

MAGNETIC DISK DEVICE AND READ PROCESSING METHOD

CROSS-REFERENCE TO RELATED APPLICATIONS

This application is based upon and claims the benefit of priority from Japanese Patent Application No. 2020-153965, filed Sep. 14, 2020, the entire contents of which are incorporated herein by reference.

FIELD

Embodiments described herein relate generally to a magnetic disk device and a read processing method.

BACKGROUND

A magnetic disk device has a magnetic disk (hereinafter, may be referred to as a disk) and a head including a write head and a read head. The write head and the read head are set at intervals in the circumferential direction of the disk. In the magnetic disk device, in a case where the head is arranged tilted with respect to the circumferential direction of the disk, the write head and the read head may be offset in a radial direction. Therefore, in a case where the write head writes a particular track to the disk, the magnetic disk device offset the read head to be arranged at the radial position obtained by offsetting the radial position where the read head is positioned by a particular distance in the radial direction, positions the read head at the central position of the radial width of the track, and reads the track.

BRIEF DESCRIPTION OF THE DRAWINGS

FIG. 1 is a block diagram illustrating a configuration of a magnetic disk device according to a first embodiment.

FIG. 17 is a block diagram illustrating a configuration of a magnetic disk device according to a third embodiment.

DETAILED DESCRIPTION

Figure 2:
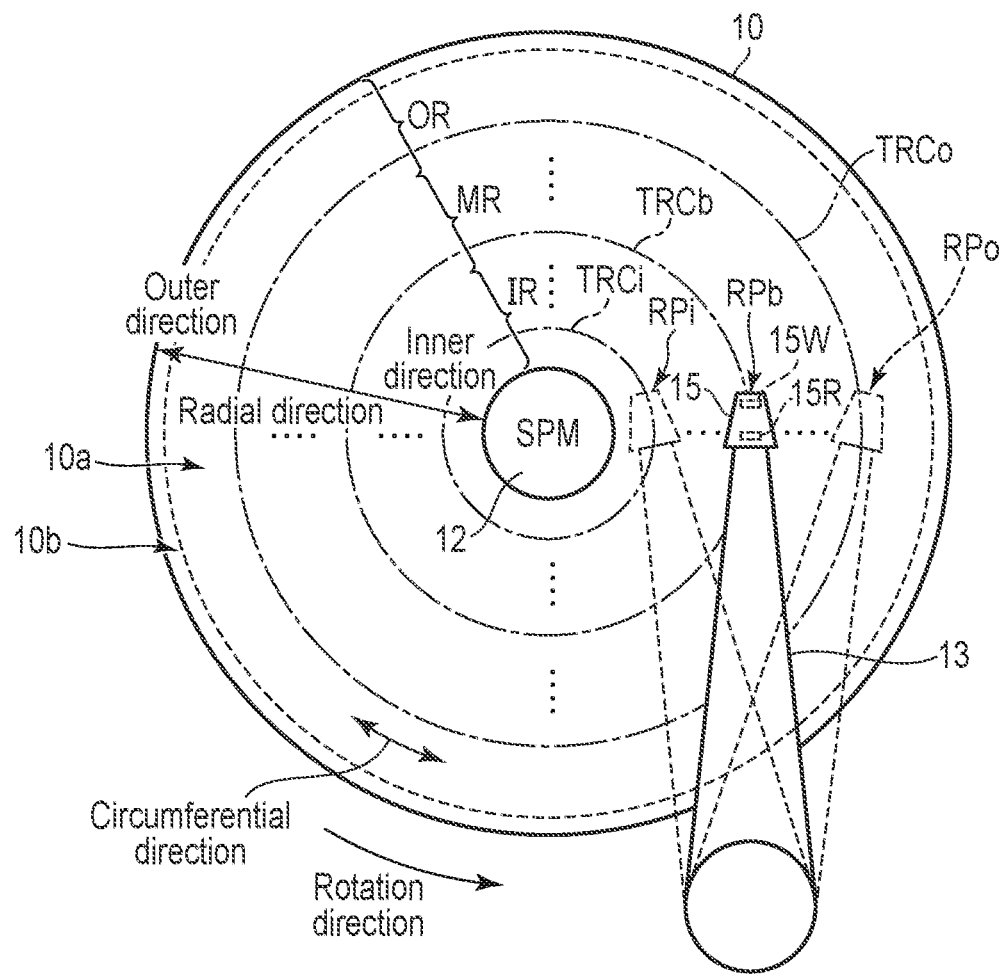
FIG. 2 is a schematic view illustrating an example of an arrangement of a head with respect to the disk according to the first embodiment.

In general, according to one embodiment, a magnetic disk device comprises: a disk; a head that has a write head that writes data to the disk and a read head that reads data from the disk; and a controller that changes an offset amount during read processing according to a vibration applied by a disturbance.

Hereinafter, embodiments will be described with reference to the drawings. Incidentally, the drawings are an example, and do not limit the scope of the invention.

First Embodiment

FIG. 1 is a block diagram illustrating a configuration of a magnetic disk device 1 according to the first embodiment.

The magnetic disk device 1 includes a head disk assembly (HDA) described later, a driver IC 20, a head amplifier integrated circuit (hereinafter, may be referred to as a head amplifier IC or a preamplifier) 30, a volatile memory 70, and non-volatile memory 80, a buffer memory (buffer) 90, and a system controller 130 which is an integrated circuit of a chip. Further, the magnetic disk device 1 is connected to a host system (host) 100. Incidentally, the magnetic disk device 1 may have a sensor, for example, an acceleration sensor or the like.

The HDA has a magnetic disk (hereinafter referred to as a disk) 10, a spindle motor (SPM) 12, an arm 13 on which a head 15 is mounted, and a voice coil motor (VCM) 14. The disk 10 is attached to the spindle motor 12 and rotates by driving the spindle motor 12. The arm 13 and the VCM 14 form an actuator. The actuator controls the movement of the head 15 mounted on the arm 13 to a particular position on the disk 10 by the driving of the VCM 14. The disk 10 and the head 15 may be provided in two or more numbers.

In the disk 10, a user data area 10*a* which can be used by a user and a system area 10*b* which records information necessary for system management are allocated in an area where data can be written. Incidentally, in the disk 10, a media cache (may be referred to as a media cache area) which temporarily holds data (or a command) transferred from the host 100 or the like before writing to a particular area of the user data area 10*a* may be allocated in an area separate from the user data area 10*a* and the system area 10*b*. Hereinafter, a direction from the inner circumference to the outer circumference of the disk 10 or a direction from the outer circumference to the inner circumference of the disk 10 is referred to as a radial direction. In the radial direction, the direction from the inner circumference to the outer circumference is referred to as an outer direction (or an outer side), and the direction from the outer circumference to the inner circumference, that is, the direction opposite to the outer direction is referred to as an inner direction (or an inner side). The direction orthogonal to the radial direction of the disk 10 is referred to as a circumferential direction. That is, the circumferential direction corresponds to the direction along the circumference of the disk 10. Further, a particular position of the disk 10 in the radial direction may be referred to as a radial position, and a particular position of the disk 10 in the circumferential direction may be referred to as a circumferential position. The radial position and the circumferential position may be collectively referred to as a position. The locus of the disk 10 extending in the circumferential direction may be referred to as a route. The route is formed by connecting the radial positions at respective circumferential positions. The disk 10 is divided into a plurality of areas (hereinafter may be referred to as zones or zone areas) at particular radial intervals. The zone includes a plurality of tracks (cylinders). Further, the track includes a plurality of sectors. The "track" is used as various meanings of an area of a plurality of areas obtained by dividing the disk 10 at particular radial intervals, a route of the head 15 at a particular radial position of the disk 10, data of the disk 10 for a round written at a particular radial position of the disk 10, data extending circumferentially in a particular radial direction of the disk 10, data written on a particular track of the disk 10, and the like. The "sector" is used as various meanings of an area of a plurality of areas obtained by dividing a particular track of the disk 10 in the circumferential direction, data written at a particular circumferential position at a particular radial position of the disk 10, data written in a particular sector of the disk 10, and the like. The "radial width of the track" may be referred to as a "track width". Further, the "radial width of the sector" may be referred to as a "sector width". The "central position of the track width at a particular circumferential position of the track" may be referred to as a "track center", and the "line connecting the center positions of the track widths at circumferential positions of the tracks" may be referred to as a "track center". The "track center" of a particular track corresponds to the central position of the sector width of a particular sector of this track.

The head 15 includes a slider as a main body, and a write head 15W and a read head 15R mounted on the slider. The write head 15W writes data to the disk 10. For example, the write head 15W writes a particular track on the disk 10. The read head 15R reads the data recorded on the disk 10. For example, the read head 15R reads a particular track on the disk 10.

FIG. 2 is a schematic view illustrating an example of the arrangement of the head 15 with respect to the disk 10 according to this embodiment. As illustrated in FIG. 2, in the circumferential direction, the direction in which the disk 10 rotates is referred to as a rotation direction. Incidentally, in the example illustrated in FIG. 2, the rotation direction is illustrated as a counterclockwise direction but may be as an opposite (clockwise) direction.

In the example illustrated in FIG. 2, the disk 10 is divided into an inner circumference region IR positioned in the inner direction, an outer circumference region OR positioned in the outer direction, and a middle circumference region MR positioned between the inner circumference region IR and the outer circumference region OR. Incidentally, the disk 10 may be divided into four or more areas, or may be divided into two or less areas. The outer circumference region OR, the middle circumference region MR, and the inner circumference region IR are arranged from the outside to the inside. In the example illustrated in FIG. 2, the outer circumference region OR, the middle circumference region MR, and the inner circumference region IR are continuously arranged from the outside to the inside. The middle circumference region MR is adjacent to the inner direction of the outer circumference region OR, and the inner circumference region IR is adjacent to the inner direction of the middle circumference region MR. Here, "adjacent" includes not only that data, objects, areas, spaces, or the like are in contact or are arranged to be in contact, but also that data, objects, areas, spaces, or the like are continuously arranged at particular intervals.

The system area 10*b* and the user data area 10*a* are arranged from the outside to the inside. In the example illustrated in FIG. 2, the system area 10*b* and the user data area 10*a* are continuously arranged from the outside to the inside. The system area 10*b* is arranged on the outside of the user data area 10*a*. In the example illustrated in FIG. 2, the system area 10*b* is arranged on the outermost circumference of the disk 10. The system area 10*b* is arranged in the outer circumference region OR. The system area 10*b* is adjacent to the outer direction of the user data area 10*a*. The user data area 10*a* is arranged on the inside of the system area 10*b*. In the example illustrated in FIG. 2, the user data area 10*a* is arranged over the outer circumference region OR to the inner circumference region IR. The user data area 10*a* is adjacent to the inside of the system area 10*b*. Incidentally, an area other than the area illustrated in FIG. 2 may be arranged in the user data area 10*a* and the system area 10*b*.

In the example illustrated in FIG. 2, the user data area 10*a* has a radial position RPi, a radial position RPb, and a radial position RPo. The radial position RPi is a position on the inside from the radial position RPb, and the radial position RPo is a position on the outside from the radial position RPb. In the example illustrated in FIG. 2, the radial position RPb is in the middle circumference region MR, the radial position RPo is in the outer circumference region OR, and the radial position RPi is in the inner circumference region IR. Incidentally, the radial position RPb may be positioned in the outer circumference region OR or the inner circumference region IR. The radial position RPi may be positioned in the middle circumference region MR or the outer circumference region OR, and the radial position RPo may be positioned in the inner circumference region IR or the middle circumference region MR. FIG. 2 illustrates a route TRCi passing through the radial position RPi, a route TRCb passing through the radial position RPb, and a route TRCo passing through the radial position RPo. The routes TRCi, TRCb, and TRCo are arranged concentrically with respect to the disk 10. For example, each of the routes TRCi, TRCb, and TRCo is a perfect circle. For example, the routes TRCi, TRCb, and TRCo correspond to track centers in a plurality of tracks corresponding to these routes TRCi, TRCb, and TRCo, respectively.

The head 15 is driven by the VCM 14 with respect to the disk 10 to rotate around a rotation axis and move to a particular position from the inside to the outside, or move from the outside to the inside. In a case where the head 15 is positioned at the radial position RPb, the skew angle is, for example, 0°. Hereinafter, the radial position RPb may be referred to as a reference position RPb. In a case where the head 15 is positioned at the radial position RPo, the skew angle is, for example, a positive value. In a case where the head 15 is positioned at the radial position RPi, the skew angle is, for example, a negative value. Incidentally, in a case where the head 15 is positioned at the radial position RPo, the skew angle may be a negative value. Further, in a case where the head 15 is positioned at the radial position RPi, the skew angle may be a positive value.

Figure 3:
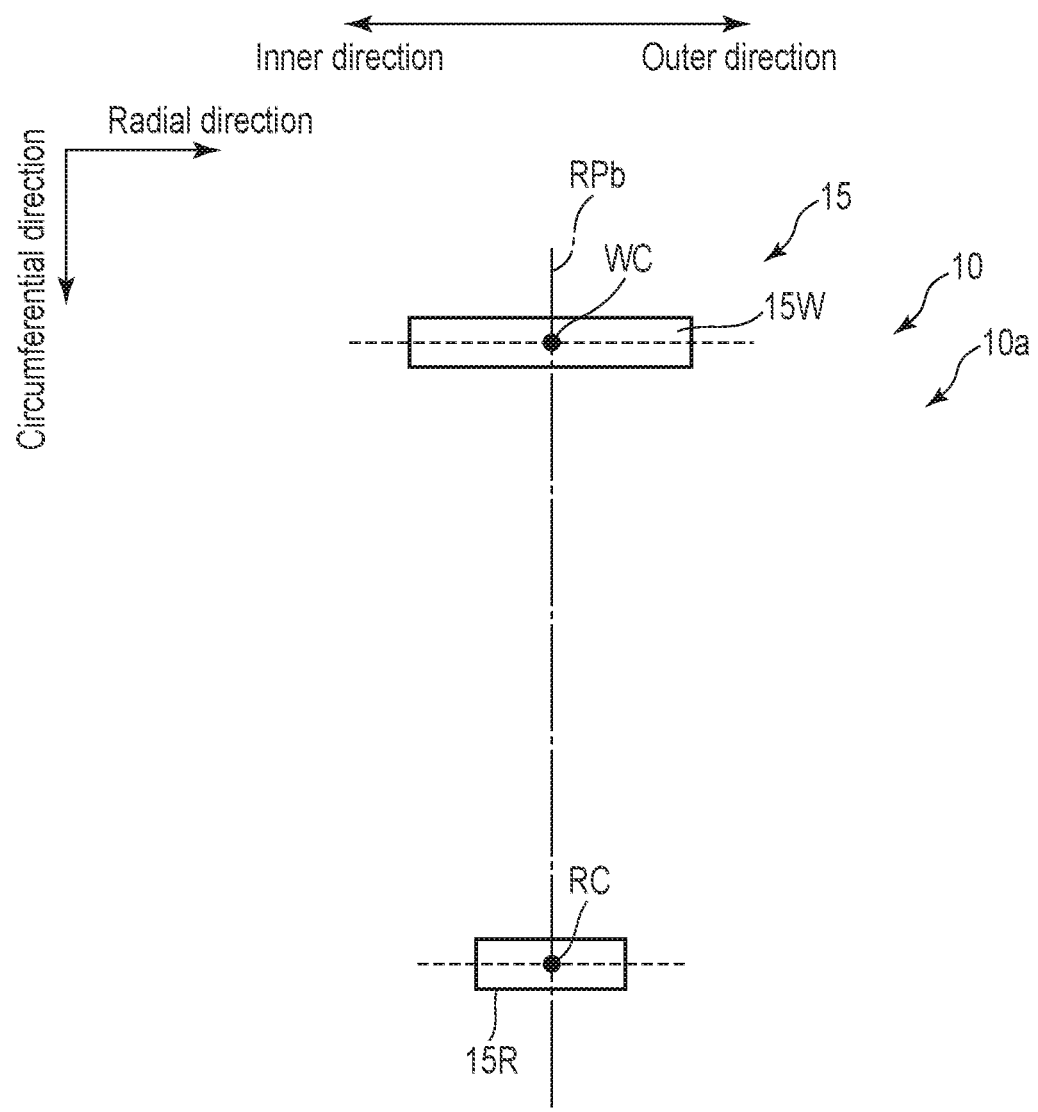
FIG. 3 is a schematic view illustrating an example of a geometric arrangement of a write head and a read head in a case where the read head is arranged at a reference position.

FIG. 3 is a schematic view illustrating an example of the geometric arrangement of the write head 15W and the read head 15R in a case where the read head 15R is arranged at the reference position RPb. In FIG. 3, the write head 15W and the read head 15R are provided at intervals in the circumferential direction. FIG. 3 illustrates the central portion WC of the write head 15W and the central portion RC of the read head 15R. Hereinafter, for convenience of explanation, the "central portion of the write head" may be simply referred to as the "write head", and the "central portion of the read head" may be simply referred to as the "read head".

In the example illustrated in FIG. 3, in a case where the read head 15R is arranged at the reference position RPb, the head 15 is not tilted in the circumferential direction. Further, the write head 15W and the read head 15R are provided at intervals in the circumferential direction. In FIG. 3, in a case where the read head 15R is arranged at the reference position RPb, the write head 15W and the read head 15R are arranged along the circumferential direction. The write head 15W and the read head 15R are not displaced in the radial direction.

Figure 4:
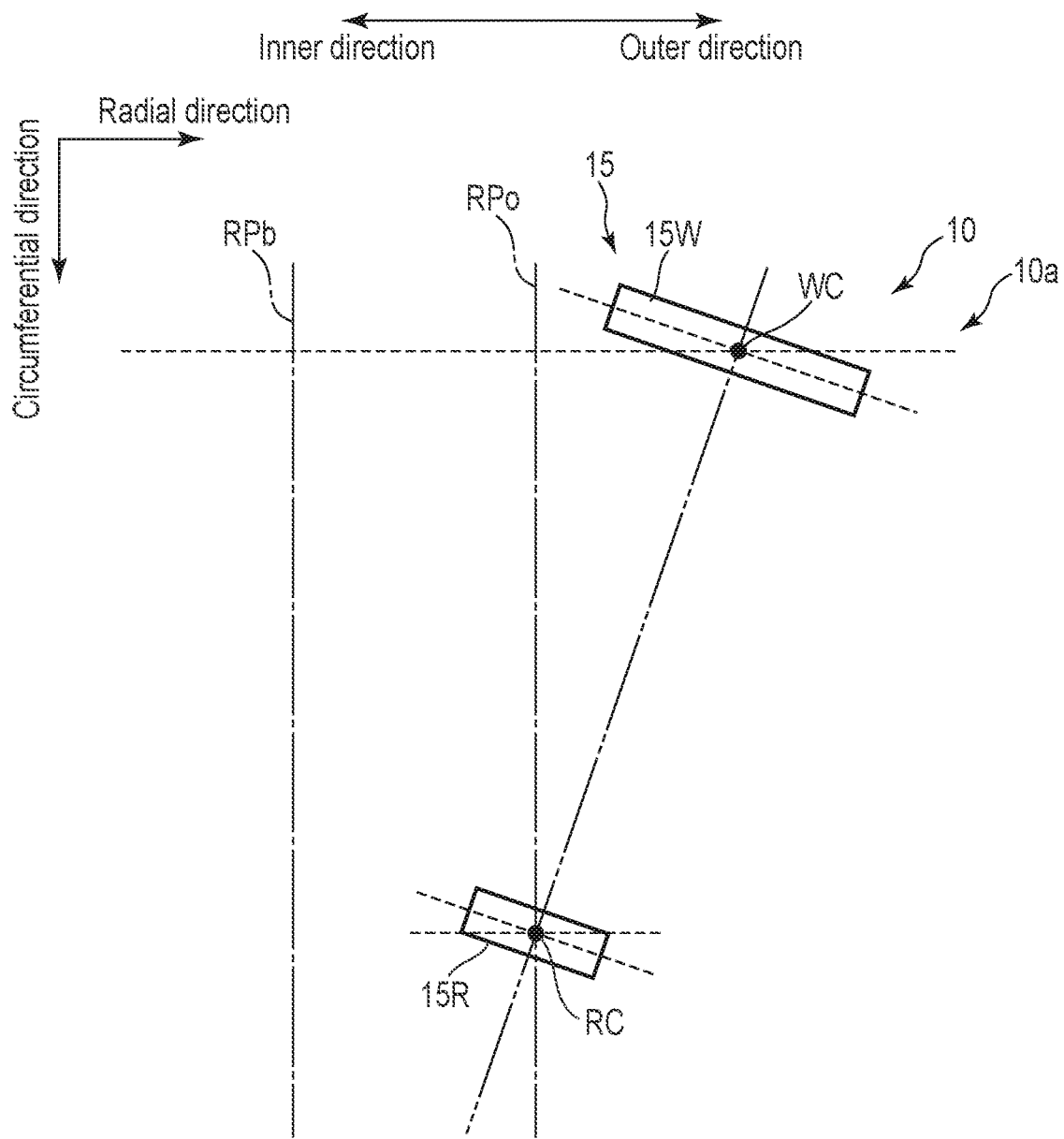
FIG. 4 is a diagram illustrating an example of the geometric arrangement of the write head and the read head in a case where the read head is arranged at a radial position.

FIG. 4 is a diagram illustrating an example of the geometric arrangement of the write head 15W and the read head 15R in a case where the read head 15R is arranged at the radial position RPo. FIG. 4 corresponds to FIG. 3.

In the example illustrated in FIG. 4, in a case where the read head 15R is arranged at the radial position RPo, the head 15 is tilted at a particular skew angle in the outer direction of the radial direction. In FIG. 4, in a case where the read head 15R is arranged at the radial position RPo, the write head 15W and the read head 15R are tilted at a particular skew angle in the outer direction of the radial direction. Further, in a case where the read head 15R is arranged at the radial position RPo, the write head 15W is displaced in the outer direction from the read head 15R.

Incidentally, even in a case where the read head 15R is arranged at the radial position RPi, the write head 15W and the read head 15R may be tilted at a particular skew angle in the inner direction similarly to a case where the read head 15R is arranged at the radial position RPo. In a case where the read head 15R is arranged at the radial position RPi, the write head 15W is displaced in the inner direction from the read head 15R.

The driver IC 20 controls the driving of the SPM 12 and the VCM 14 according to the control of the system controller 130 (specifically, an MPU 60 described later).

The head amplifier IC (preamplifier) 30 includes a read amplifier and a write driver. The read amplifier amplifies a read signal read from the disk 10 and outputs the signal to the system controller 130 (specifically, a read/write (R/W) channel 40 described later). The write driver outputs a write current corresponding to the write data output from the R/W channel 40 to the head 15.

The volatile memory 70 is a semiconductor memory in which stored data is lost when the power supply is cut off. The volatile memory 70 stores data and the like required for processing in each unit of the magnetic disk device 1. The volatile memory 70 is, for example, a Dynamic Random Access Memory (DRAM) or a Synchronous Dynamic Random Access Memory (SDRAM).

The non-volatile memory 80 is a semiconductor memory which records data stored even when the power supply is cut off. The non-volatile memory 80 is, for example, a NOR type or NAND type Flash Read Only Memory (flash ROM: FROM).

The buffer memory 90 is a semiconductor memory which temporarily records data and the like transmitted and received between the magnetic disk device 1 and the host 100. Incidentally, the buffer memory 90 may be integrally configured with the volatile memory 70. The buffer memory 90 is, for example, a DRAM, a Static Random Access Memory (SRAM), an SDRAM, a Ferroelectric Random Access memory (FeRAM), a Magnetoresistive Random Access Memory (MRAM), or the like.

The system controller (controller) 130 is realized, for example, by using a large-scale integrated circuit (LSI) which is referred to as a System-on-a-Chip (SoC) in which a plurality of elements are integrated on a single chip. The system controller 130 includes a read/write (R/W) channel 40, a hard disk controller (HDC) 50, a microprocessor (MPU) 60, and the like. The R/W channels 40, the HDC 50, and the MPU 60 are electrically connected to each other. The system controller 130 is electrically connected to, for example, the driver IC 20, the head amplifier IC 30, the volatile memory 70, the non-volatile memory 80, the buffer memory 90, the host system 100, and the like.

The R/W channel 40 executes signal processing of data transferred from the disk 10 to the host 100, for example, read data and data transferred from the host 100, for example, write data in response to an instruction from the MPU 60 described later. The R/W channel 40 has a circuit or a function for measuring the signal quality of the read data. The R/W channel 40 is electrically connected to, for example, the head amplifier IC 30, the HDC 50, and the MPU 60.

The HDC 50 controls the transfer of data. For example, the HDC 50 controls the transfer of data between the host 100 and the disk 10 in response to the instruction from the MPU 60 described later. The HDC 50 is electrically connected to, for example, the R/W channel 40, the MPU 60, the volatile memory 70, the non-volatile memory 80, and the buffer memory 90.

The MPU 60 is a main controller which controls each unit of the magnetic disk device 1. The MPU 60 controls the VCM 14 via the driver IC 20 and executes servo control for positioning the head 15. The MPU 60 controls the SPM 12 via the driver IC 20 and rotates the disk 10. The MPU 60 controls the operation of writing data to the disk 10 and selects the storage destination of the data transferred from the host 100, for example, the write data. In addition, the MPU 60 controls the operation of reading the data from the disk 10 and controls the processing of the data transferred from the disk 10 to the host 100, for example, the read data. For example, the MPU 60 executes processing based on firmware. The MPU 60 is connected to each unit of the magnetic disk device 1. The MPU 60 is electrically connected to, for example, the driver IC 20, the R/W channel 40, and the HDC 50.

The MPU 60 includes a write controller 610 which controls write processing, a read controller 620 which controls read processing, and the like. The MPU 60 executes the processing of each of these units such as the write controller 610 and the read controller 620 on the firmware. Incidentally, the MPU 60 may include each of these units such as the write controller 610 and the read controller 620 as a circuit. Hereinafter, "write" or "write processing" and "read" or "read processing" may be collectively expressed by the term "access" or "access processing".

The write controller 610 controls the write processing of data according to a command from the host 100 or the like. The write controller 610 controls the VCM 14 via the driver IC 20, arranges the head 15 at a particular position on the disk 10, and writes data. The write controller 610 may randomly write data or sequentially write data. Hereinafter, "positioning the central portion of the head 15 (the write head 15W or the read head 15R) at a particular position" or "arranging the central portion of the head 15 (the write head 15W or the read head 15R) at a particular position" may be simply referred to as "positioning the head 15 (the write head 15W or the read head 15R) at a particular position" or "arranging the head 15 (the write head 15W or the read head 15R) at a particular position". Further, "positioning the head 15 (the write head 15W or the read head 15R) at a particular position" or "arranging the head 15 (the write head 15W or the read head 15R) at a particular position" may be simply referred to as "positioning" or "arranging".

The write controller 610 arranges the head 15 (read head 15R) at the position (hereinafter referred to as a target position or a target write position) of the read head 15R which is a target during write processing such that the write head 15W is positioned at the position (hereinafter, may be referred to as a target write head position) of the write head 15W which is a target during write processing, and writes data. In other words, the write controller 610 arranges the read head 15R at the radial position (hereinafter, may be referred to as a target radial position or a target write radial position) of the read head 15R which is a target such that the write head 15W is arranged at the radial position (hereinafter, may be referred to as a target write head radial position) of the write head 15W which is a target during write processing at a particular circumferential position, and writes data. The write controller 610 arranges the read head 15R at the target write position and writes data with the write head 15W arranged at the target write head position. For example, the write controller 610 controls the read head 15R to be arranged at the target write radial position at a particular circumferential position, and writes a particular sector with the write head 15W arranged at the target write head position. Further, the write controller 610 controls the read head 15R along the route (hereinafter, may be referred to as a target route or a target write route) which is a target of the read head 15R during write processing such that the head 15 (write head 15W) follows the path (hereinafter, may be referred to as a target write head path) which is a target of the write head 15W during write processing, and writes a particular track.

In a case where data is written by the write head 15W, the write head 15W may generate a leakage magnetic field (hereinafter, also referred to as an erase magnetic field) in the surroundings. When writing data, the write head 15W may write undesired data (hereinafter, may be referred to as an erase band) around the target data due to the erase magnetic field. For example, when the write head 15W writes data with being tilted (inclined) at a particular skew angle in the outer direction, the write head may write an erase band in the inner direction of the target data due to the erase magnetic field. Further, when the write head 15W writes data with being tilted (inclined) at a particular skew angle in the inner direction, the write head may write an erase band in the outer direction of the target data due to the erase magnetic field.

The read controller 620 controls the read processing of data according to a command from the host 100 or the like. The read controller 620 controls the VCM 14 via the driver IC 20, arranges the head 15 at a particular position on the disk 10, and reads data. The read controller 620 may read the data randomly or sequentially.

For example, in a case where the error rate during reading a particular data is equal to or lower than a particular error rate (hereinafter, may be referred to as an error rate threshold), the read controller 620 can read the data within a particular number of read retries. For example, in a case where the error rate during reading a particular data is larger than the error rate threshold, the read controller 620 cannot read the data (read error), cannot read the data within the particular number of read retries not to read as Uncorrectable Error, or stops read processing.

The read controller 620 arranges the head 15 (read head 15R) at a position (hereinafter, may be referred to as a target position or a target read position) which is a target during read processing and reads data. The read controller 620 arranges the head 15 (read head 15R) at the target read position and reads data. In other words, the read controller 620 controls the head 15 such that the read head 15R is arranged at the radial position (hereinafter, may be referred to as a target radial position or a target read radial position) which is a target during read processing at a particular circumferential position, and reads data. For example, the read controller 620 controls the head 15 to arrange the read head 15R at the target read radial position at a particular circumferential position and read a particular sector. Further, the read controller 620 controls the head 15 such that the read head 15R moves along the route (hereinafter, may be referred to as a target route or a target read route) which is target during read processing and reads data. For example, the read controller 620 controls the head 15 such that the read head 15R moves along the route (hereinafter, may be referred to as a target route or a target read route) which is target during read processing and reads a particular track.

The read controller 620 arranges the head 15 (read head 15R) at a particular position according to a vibration state due to a disturbance (hereinafter, may be referred to as an external disturbance) applied from the outside, a steady disturbance (hereinafter, may be referred to as an internal disturbance) generated from the inside of the magnetic disk device 1, or the like, and reads data. In other words, the read controller 620 changes or switches an offset amount or a displacement amount (hereinafter, may be referred to as a read offset amount) of the head 15 during read processing according to the vibration state due to external disturbance, internal disturbance, or the like.

In a case where a particular magnitude (hereinafter, may be referred to as a vibration threshold) or more of vibration is applied due to an external disturbance or the like or a case where a vibration of the vibration threshold or more is detected by the size of a positioning error or a sensor or the like mounted on the outside or inside of the magnetic disk device 1 when a vibration due to an external disturbance or the like is applied, the read controller 620 arranges the head 15 (read head 15R) at the position (hereinafter, may be referred to as a correction read position) obtained by correcting the target write position (or the target read position), and reads data. In other words, in a case where the vibration threshold or more of vibration is applied due to an external disturbance or the like or a case where the vibration threshold or more of vibration is detected when a vibration due to an external disturbance or the like is applied, the read controller 620 arranges the head 15 (read head 15R) at the position (hereinafter, may be referred to as a correction read radial position) obtained by correcting the target write radial position (or the target read radial position) at a particular circumferential position, and reads data. For example, in a case where the vibration threshold or more of radial vibration is applied due to an external disturbance or the like or a case where the vibration threshold or more of radial vibration is detected when a vibration due to an external disturbance or the like is applied, the read controller 620 arranges the head 15 (read head 15R) at the correction read radial position at a particular circumferential position and reads data. Hereinafter, a "case where the vibration threshold or more of vibration is applied due to an external disturbance or the like", a "case where the vibration threshold or more of radial vibration is applied due to an external disturbance or the like", a "case where the vibration threshold or more of vibration is detected when a vibration due to an external disturbance or the like is applied", and a "case where the vibration threshold or more of radial vibration is detected when a vibration due to an external disturbance or the like is applied" also be referred to as "the case of vibrating", "the case of vibration state", "the case of vibration detection", or "the case of vibration state".

In the case of vibration detection in a state where the head 15 is tilted (inclined) at a particular skew angle, the read controller 620 arranges the head 15 (read head 15R) at the correction read radial position and reads data. In the case of vibration detection in a state where the head 15 is tilted at a particular skew angle, the read controller 620 arranges the head 15 (read head 15R) at the correction read radial position calculated based on a target write radial position at a particular circumferential position and an offset amount (hereinafter, may be referred to as a correction offset amount or a correction read offset amount) for correction corresponding to the circumferential position, and reads data.

For example, the read controller 620 measures, detects, or calculates the correction read radial position at each radial position, each sector, or each track based on the error rate threshold at the time of manufacturing, and measures, detects, or calculates each correction offset amount based on each radial position, each sector, or each target write radial position and each correction read radial position corresponding to each track. For example, the read controller 620 may record each radial position measured, detected, or calculated or each correction offset amount and each correction read radial position corresponding to each sector or each track as a table in a particular recording area such as the system area 10b of the disk 10, the volatile memory 70, the non-volatile memory 80, and the buffer memory 90.

When the read head 15R is arranged and reads at each radial position positioned in the radial direction from the target read radial position of a particular track among a plurality of tracks which are continuously written side by side in the radial direction with the head 15 tilted at a particular skew angle, the distribution of the error rate corresponding to the track may change sharply in a portion corresponding to a side close to the erase band of a track (hereinafter, may be referred to as an adjacent track) adjacent to the track in the radial direction from the vertex corresponding to the target read radial position in order to detect the erase band of the adjacent track as noise, and may be indicated by a downwardly convex curve (hereinafter, also referred to as a downward-convex curve) which gradually changes in the portion corresponding to the side close to the erase band of the track from the vertex corresponding to the target read radial position.

For example, the target read radial position corresponds to the radial position corresponding to the smallest error rate (hereinafter referred to as a minimum error rate) in the downward-convex curve formed by each error rate corresponding to each radial position in the radial direction from the target read radial position of a particular track. Incidentally, the target read radial position may correspond to the radial position corresponding to an error rate other than the minimum error rate.

For example, the correction read radial position corresponds to a radial position corresponding to an error rate corresponding to a point where a straight which crosses with bisecting a straight line connecting two points as error rate thresholds in the distribution of the error rate indicated by the downward-convex curve corresponding to a particular track intersects the downward-convex curve. In other words, the correction read radial position corresponds to an intermediate radial position between a radial position (hereinafter, may be simply referred to as a boundary position) which is a boundary between a radial area where a particular track (or a particular sector) can be read and an area where a particular track (or a particular sector) which is positioned on the outside of the radial area where the particular track (or the particular sector) can be read cannot be read and a boundary position between a radial area where a particular track (or a particular sector) can be read and an area where a particular track (or a particular sector) positioned on the outside of the radial area where the particular track (or the particular sector) can be read cannot be read. For example, the correction read radial position corresponds to a radial position corresponding to an error rate corresponding to a point where a straight line which bisects a straight line connecting two points as error rate thresholds in the distribution of an error rate indicated by a downward-convex curve asymmetrical to an axis passing through a vertex corresponding to a target read radial position of a particular track and does not pass through the vertex of the downward-convex curve intersects the downward-convex curve. Incidentally, the correction read radial position may be set to a particular radial position corresponding to an error rate equal to or lower than the error rate threshold depending on the vibration state, or may be set to a particular radial position corresponding to an error rate larger than the error rate threshold. For example, the correction read radial position may be set to a radial position corresponding to an error rate equal to or less than the error rate threshold when data is read by the read head 15R in the radial range in which the read head 15R swings in the case of vibration detection and non-vibration detection. Further, for example, the correction read radial position may be set to a particular radial position corresponding to an error rate larger than the error rate threshold when data is read by the read head 15R in the radial range in which the read head 15R swings in the case of vibration detection.

In a case where a vibration smaller than the vibration threshold is applied due to internal disturbance or the like, a case where a vibration is not applied, a case where a vibration smaller than the vibration threshold is detected by the size of a positioning error or a sensor or the like when a vibration due to an external disturbance or the like is applied, or a case where a vibration is not detected by the size of a positioning error or a sensor or the like when a vibration due to an external disturbance or the like is applied, the read controller 620 arranges the head 15 (read head 15R) at the target read position and reads data. In other words, in a case where a vibration smaller than the vibration threshold is applied due to internal disturbance or the like, a case where a vibration is not applied, a case where a vibration smaller than the vibration threshold is detected by the size of a positioning error or a sensor or the like when a vibration due to an external disturbance or the like is applied, or a case where a vibration is not detected by the size of a positioning error or a sensor or the like when a vibration due to an external disturbance or the like is applied, the read controller 620 arranges the head 15 (read head 15R) at the target read radial position at a particular circumferential position and reads data. For example, in a case where a radial vibration smaller than the vibration threshold is applied due to internal disturbance or the like, a case where a radial vibration is not applied, a case where a radial vibration smaller than the vibration threshold is detected by the size of a positioning error or a sensor or the like when a radial vibration due to an external disturbance or the like is applied, or a case where a radial vibration is not detected by the size of a positioning error or a sensor or the like when a vibration due to an external disturbance or the like is applied, the read controller 620 arranges the head 15 (read head 15R) at the target read radial position at a particular circumferential position and reads data. Hereinafter, a "case where a vibration smaller than the vibration threshold is applied due to internal disturbance or the like", a "case where a vibration is not applied", a "case where a vibration smaller than the vibration threshold is detected by the size of a positioning error or a sensor or the like when a vibration due to an external disturbance or the like is applied", or a "case where a vibration is not detected by the size of a positioning error or a sensor or the like when a vibration due to an external disturbance or the like is applied" may be simply referred to as "the case of not vibrating", "the case of stationary", "the case of non-vibration detection", or "the case of stationary state". Further, a "case where a radial vibration smaller than the vibration threshold is applied due to internal disturbance or the like", a "case where a radial vibration is not applied", a "case where a radial vibration smaller than the vibration threshold is detected by the size of a positioning error or a sensor or the like when a radial vibration due to an external disturbance or the like is applied", or a "case where a radial vibration is not detected by the size of a positioning error or a sensor or the like when a vibration due to an external disturbance or the like is applied" may also be simply referred to as "the case of not vibrating", "the case of stationary", "the case of non-vibration detection", or "the case of stationary state".

Figure 5:
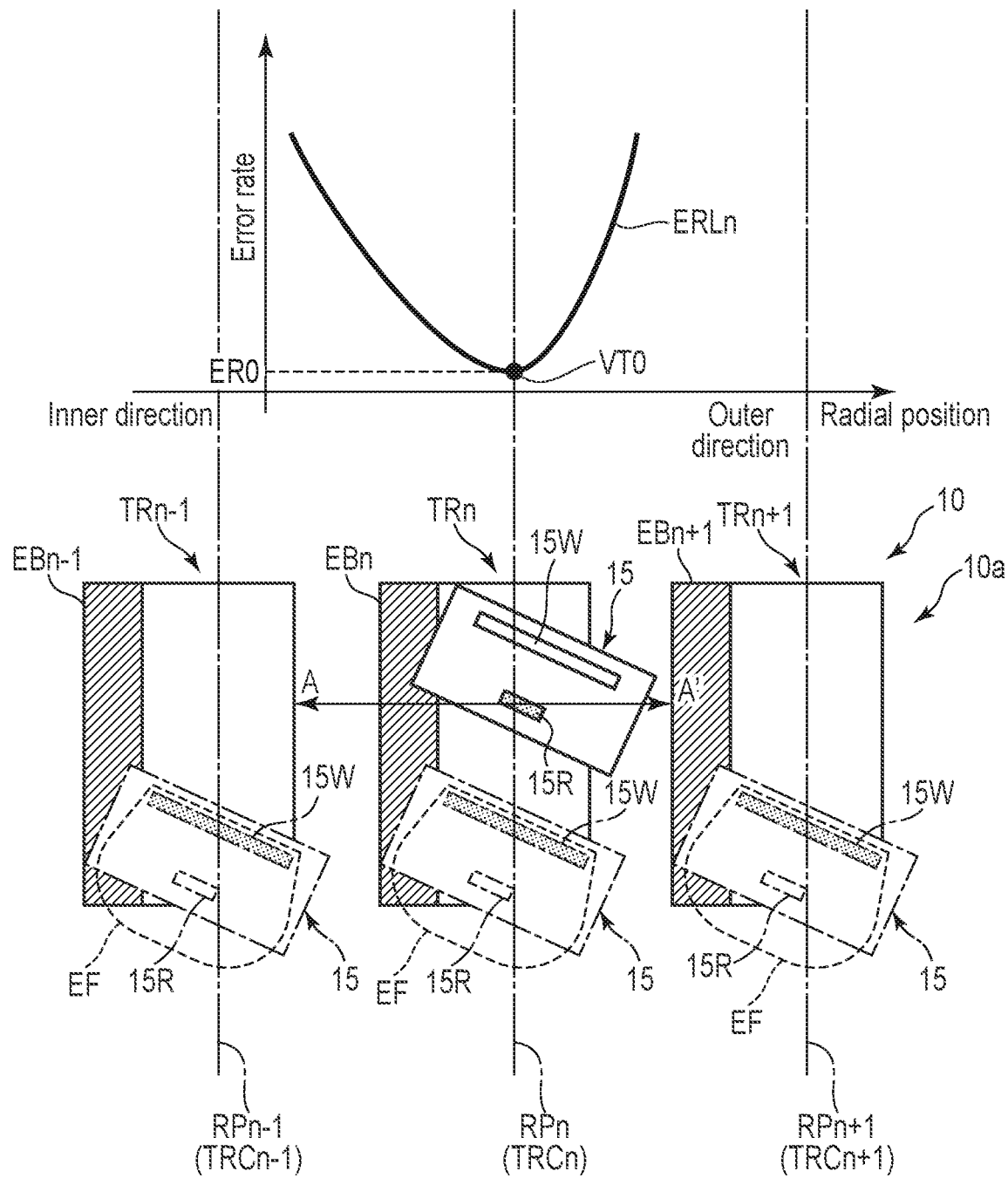
FIG. 5 is a diagram illustrating an example of a change in error rate with respect to the radial position in a case where a track of a plurality of written tracks is read with the head tilted at a particular skew angle in an outer direction.

FIG. 5 is a diagram illustrating an example of a change ERLn in error rate with respect to the radial position in a case where a track TRn of a plurality of written tracks TRn−1, TRn, and TRn+1 is read with the head 15 tilted at a particular skew angle in the outer direction. In FIG. 5, a horizontal axis represents the radial position, and a vertical axis represents the error rate. On the horizontal axis illustrated in FIG. 5, the radial position is directed as the outer direction toward the tip side of an arrow and is directed as the inner direction toward the side opposite to the tip side of the arrow. Incidentally, on the horizontal axis illustrated in FIG. 5, the radial position may be directed as the inner direction toward the tip side of an arrow and is directed as the outer direction toward the side opposite to the tip side of the arrow. The horizontal axis in FIG. 5 represents radial positions RPn−1, RPn, and RPn+1. For example, the radial positions RPn−1, RPn, and RPn+1 correspond to a radial position on the outside from the reference position RPb. Incidentally, the radial positions RPn−1, RPn, and RPn+1 may correspond to a radial position on the inside from the reference position RPb. The radial position RPn is positioned on the outside from the radial position RPn−1, and the radial position RPn+1 is positioned on the outside from the radial position RPn. Incidentally, the radial position RPn is positioned on the inside from the radial position RPn−1, and the radial position RPn+1 is positioned on the inside from the radial position RPn. The radial position RPn corresponds to the target write head radial position and the target read radial position. On the vertical axis illustrated in FIG. 5, the error rate increases toward the tip side of an arrow and decreases toward the side opposite to the tip side of the arrow. The vertical axis of FIG. 5 represents a minimum error rate ER0. The minimum error rate ER0 corresponds to the radial position RPn. FIG. 5 illustrates a change (hereinafter, may be simply referred to as a change in error rate) ERLn in error rate with respect to the radial position indicated by the downward-convex curve having a vertex VT0 having the error rate ER0 at the radial position RPn. The change ERLn in error rate is asymmetric with respect to a straight line passing through the vertex VT0 and parallel to the vertical axis.

FIG. 5 illustrates a plurality of tracks TRn−1, TRn, and TRn+1 which are continuously written at radial intervals with the head 15 tilted at a particular skew angle in the radial direction, for example, the outer direction. Incidentally, the plurality of tracks TRn−1, TRn, and TRn+1 may be continuously written at radial intervals with the head 15 tilted at a particular skew angle in the inner direction. In the example illustrated in FIG. 5, the track TRn is written at an interval from the track TRn−1 in the outer direction, and the track TRn+1 is written at an interval from the track TRn in the outer direction. The track TRn is adjacent to the outer direction of the track TRn−1, and the track TRn+1 is adjacent to the outer direction of the track TRn. The track TRn−1 is adjacent to an erase band EBn−1 in the inner direction. The track TRn is adjacent to an erase band EBn in the inner direction. The track TRn+1 is adjacent to an erase band EBn+1 in the inner direction. FIG. 5 illustrates the head 15. The head 15 is tilted at a particular skew angle in the outer direction. The write head 15W may write the erase bands EBn−1, EBn, and EBn+1 by erase magnetic fields EF when writing respective tracks TRn−1, TRn, and TRn+1. In FIG. 5, a range from A to A' corresponds to a radial range in which the error rate is detected or measured.

In the example illustrated in FIG. 5, the MPU 60 arranges the read head 15R at a particular radial position such that the write head 15W is arranged at the radial position RPn−1 with the head 15 tilted at a particular skew angle in the outer direction, and writes the track TRn−1. The radial position RPn−1 corresponds to a track center TRCn-1 of the track TRn−1. In a case where the write head 15W is arranged at the radial position RPn−1 and writes the track TRn−1 with the head 15 tilted at a particular skew angle, the MPU 60 writes the erase band EBn−1 by the erase magnetic field EF.

In the example illustrated in FIG. 5, the MPU 60 arranges the read head 15R at a particular radial position such that the write head 15W is arranged at the radial position RPn with the head 15 tilted at a particular skew angle in the outer direction, and writes the track TRn. The radial position RPn corresponds to a track center TRCn of the track TRn. In a case where the write head 15W is arranged at the radial position RPn and writes the track TRn with the head 15 tilted at a particular skew angle, the MPU 60 writes the erase band EBn by the erase magnetic field EF.

In the example illustrated in FIG. 5, the MPU 60 arranges the read head 15R at a particular radial position such that the write head 15W is arranged at the radial position RPn+1 with the head 15 tilted at a particular skew angle in the outer direction, and writes the track TRn+1. The radial position RPn+1 corresponds to a track center TRCn+1 of the track TRn+1. In a case where the write head 15W is arranged at the radial position RPn+1 and writes the track TRn+1 with the head 15 tilted at a particular skew angle, the MPU 60 writes the erase band EBn+1 by the erase magnetic field EF.

In the example illustrated in FIG. 5, the MPU 60 arranges the read head 15R at each radial position within a radial range A-A' with the heads 15 tilted at a particular skew angle in the outer direction, reads the track TRn, and measures or detects the change ERLn in error rate. For example, the MPU 60 arranges the read head 15R at the radial position (target read radial position) RPn with the head 15 tilted at a particular skew angle in the outer direction, reads the track TRn, and measures or detects the error rate ER0. The MPU 60 may record the change ERLn in error rate in a particular recording area such as the system area 10b of the disk 10, the volatile memory 70, the non-volatile memory 80, and the buffer memory 90.

In the example illustrated in FIG. 5, the change ERLn in error rate changes asymmetrically with respect to the axis (for example, the straight line at the radial position RPn) passing through the vertex VT0. In FIG. 5, the change ERLn in error rate is affected by the erase band EBn+1 of the track TRn+1 adjacent to the outer direction of the track TRn and thus sharply changes at the portion corresponding to the erase band EBn+1 side from the vertex VT0 corresponding to the radial position RPn. The change ERLn is not affected or hardly affected by the erase band EBn−1 of track TRn−1 adjacent in the inner direction to track TRn and thus gradually changes at the portion corresponding to the track TRn−1 side from the vertex VT0 corresponding to the radial position RPn. Incidentally, in the example illustrated in FIG. 5, a case is described in which the head 15 is tilted at a particular skew angle in the outer direction, but the same description may be applied to a case where the head 15 is tilted at a particular skew angle in the inner direction.

Figure 6:
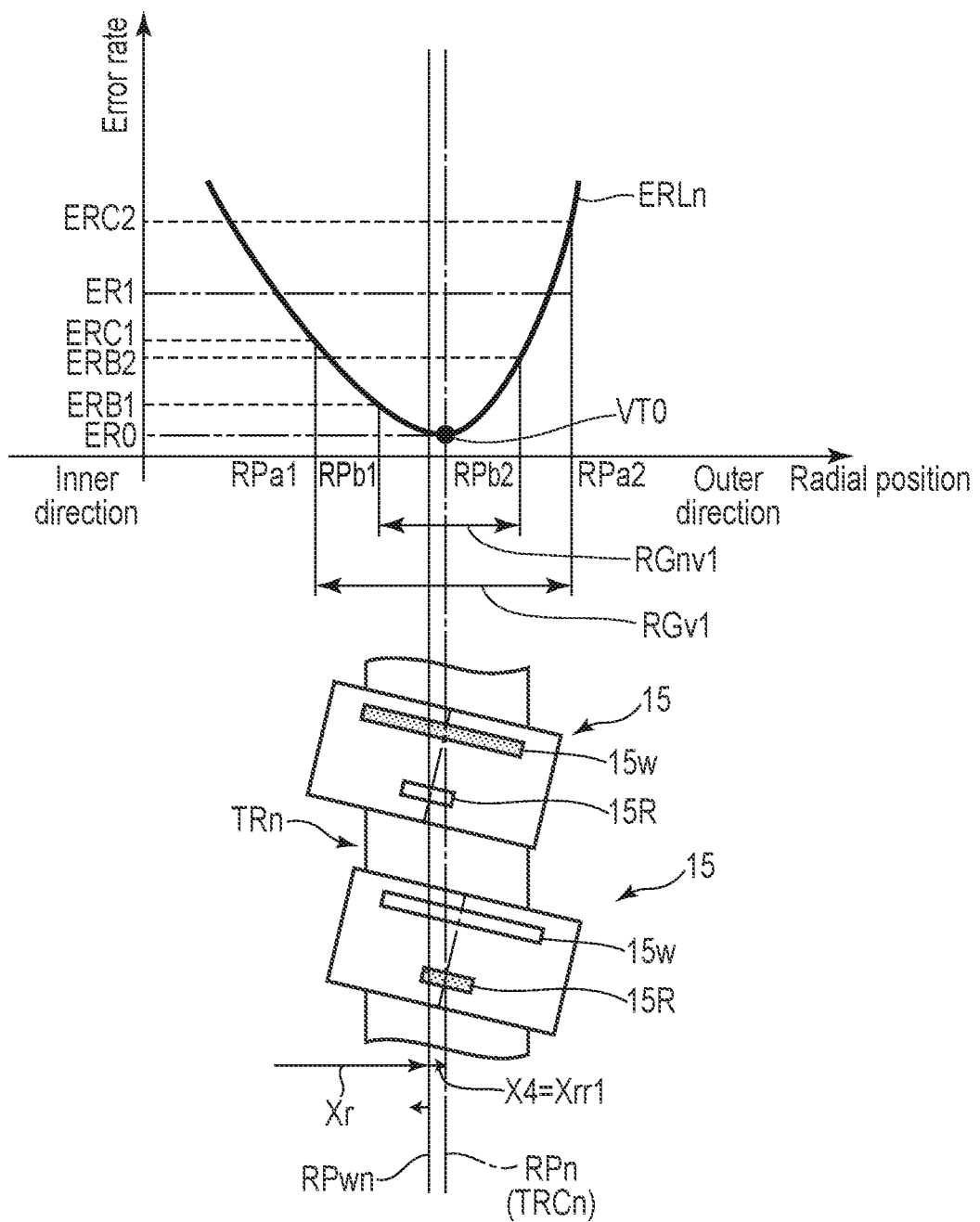
FIG. 6 is a schematic diagram illustrating an example of a change in error rate with respect to the radial position in a case where the read head is arranged at a target read radial position.

FIG. 6 is a schematic diagram illustrating an example of the change ERLn in error rate with respect to the radial position in a case where the read head 15R is arranged at the target read radial position RPn. FIG. 6 illustrates the track TRn. FIG. 6 corresponds to FIG. 5. The horizontal axis of FIG. 6 represents radial positions RPa1, RPb1, RPwn, RPn, RPb2, and RPa2. The radial position RPb1 is positioned on the outside from the radial position RPa1, and the radial position RPwn is positioned on the outside from the radial position RPb1. The radial position RPn is positioned on the outside from the radial position RPwn, the radial position RPb2 is positioned on the outside from the radial position RPn, and the radial position RPa2 is positioned on the outside from the radial position RPb2. The radial position RPn corresponds to the target read radial position. The radial position RPwn corresponds to the target write radial position. FIG. 6 illustrates an offset amount Xr corresponding to a distance from the radial position (hereinafter, may be referred to as an original radial position) which is the origin to the target write radial position. Hereinafter, the "offset amount Xr" may be referred to as a "target write radial position Xr", or may be referred to as a "target write offset amount Xr". Further, in FIG. 6, an offset amount X4 corresponding to a distance from the target write radial position to the target read radial position corresponds to a distance (hereinafter, may be referred to as the target offset amount or the target lead offset amount) Xrr1. FIG. 6 illustrates a range RGv1 centered on the radial position RPn from the radial position RPa1 to the radial position RPa2 and a range RGnv1 centered on the radial position RPn from the radial position RPb1 to the radial position RPb2. In FIG. 6, the distance from the radial position RPa1 to the radial position RPn and the distance from the radial position RPn to the radial position RPa2 are the same. Incidentally, the distance from the radial position RPa1 to the radial position RPn may be different from the distance from the radial position RPn to the radial position RPa2. In FIG. 6, the distance from the radial position RPb1 to the radial position RPn and the distance from the radial position RPn to the radial position RPb2 are the same. The distance from the radial position RPb1 to the radial position RPn may be different from the distance from the radial position RPn to the radial position RPb2. For example, the range RGv1 corresponds to a range in which the read head 15R swings or is displaced in the radial direction about the radial position RPn in the case of vibration detection in a state where the read head 15R is arranged at the radial position RPn. For example, the range RGnv1 corresponds to a range in which the read head 15R swings or is displaced in the radial direction about the radial position RPn in the case of non-vibration detection in a state where the read head 15R is arranged at the radial position RPn.

The vertical axis of FIG. 6 represents error rates ERB1, ERB2, ERC1, ERC2, and ER1. The error rate ERB1 is greater than the error rate ER0, the error rate ERB2 is greater than the error rate ERB1, the error rate ERC1 is greater than the error rate ERB1, the error rate ER1 is greater than the error rate ERC1, and the error rate ERC2 is greater than the error rate ER1. The error rate ERB1 is an error rate in a case where the read head 15R is arranged at the radial position RPb1 and reads, and the error rate ERB2 is an error rate in a case where the read head 15R is arranged at the radial position RPb2 and reads. The error rate ERC1 is an error rate in a case where the read head 15R is arranged at the radial position RPa1 and reads, and the error rate ERC2 is an error rate in a case where the read head 15R is arranged at the radial position RPa2 and reads. The error rate ER1 corresponds to the error rate threshold.

In the example illustrated in FIG. 6, the MPU 60 arranges the read head 15R at the target write radial position RPwn such that the write head 15W is arranged at the radial position RPn with the head 15 tilted at a particular skew angle in the outer direction, and writes the track TRn.

In the example illustrated in FIG. 6, the MPU 60 arranges the read head 15R at the target read radial position RPn displaced by the target offset amount X4=Xrr1 from the target write radial position RPwn in the outer direction in the case of non-vibration detection in a state where the head 15 is tilted at a particular skew angle in the outer direction, and the read head 15R reads the track TRn while swinging due to the vibration due to internal disturbance or the like in the range RGnv1 in the radial direction. In this case, the error rate in a case where the track TRn is read by the read head 15R fluctuates in a range from the error rate ER0 to the error rate ERB2 and thus is equal to or less than the error rate threshold ER1.

In the example illustrated in FIG. 6, the MPU 60 arranges the read head 15R at the target read radial position RPn displaced by the target offset amount X4=Xrr1 from the target write radial position RPwn in the outer direction in the case of vibration detection in a state where the head 15 is tilted at a particular skew angle in the outer direction, and the read head 15R reads the track TRn while swinging due to the vibration due to external disturbance or the like in the range RGv1 in the radial direction. In this case, the error rate in a case where the track TRn is read by the read head 15R fluctuates in a range from the error rate ER0 to the error rate ERC2 and thus is greater than the error rate threshold ER1. Incidentally, in the example illustrated in FIG. 6, a case is described in which the head 15 is tilted at a particular skew angle in the outer direction, but the same description may be applied to a case where the head 15 is tilted at a particular skew angle in the inner direction.

Figure 7:
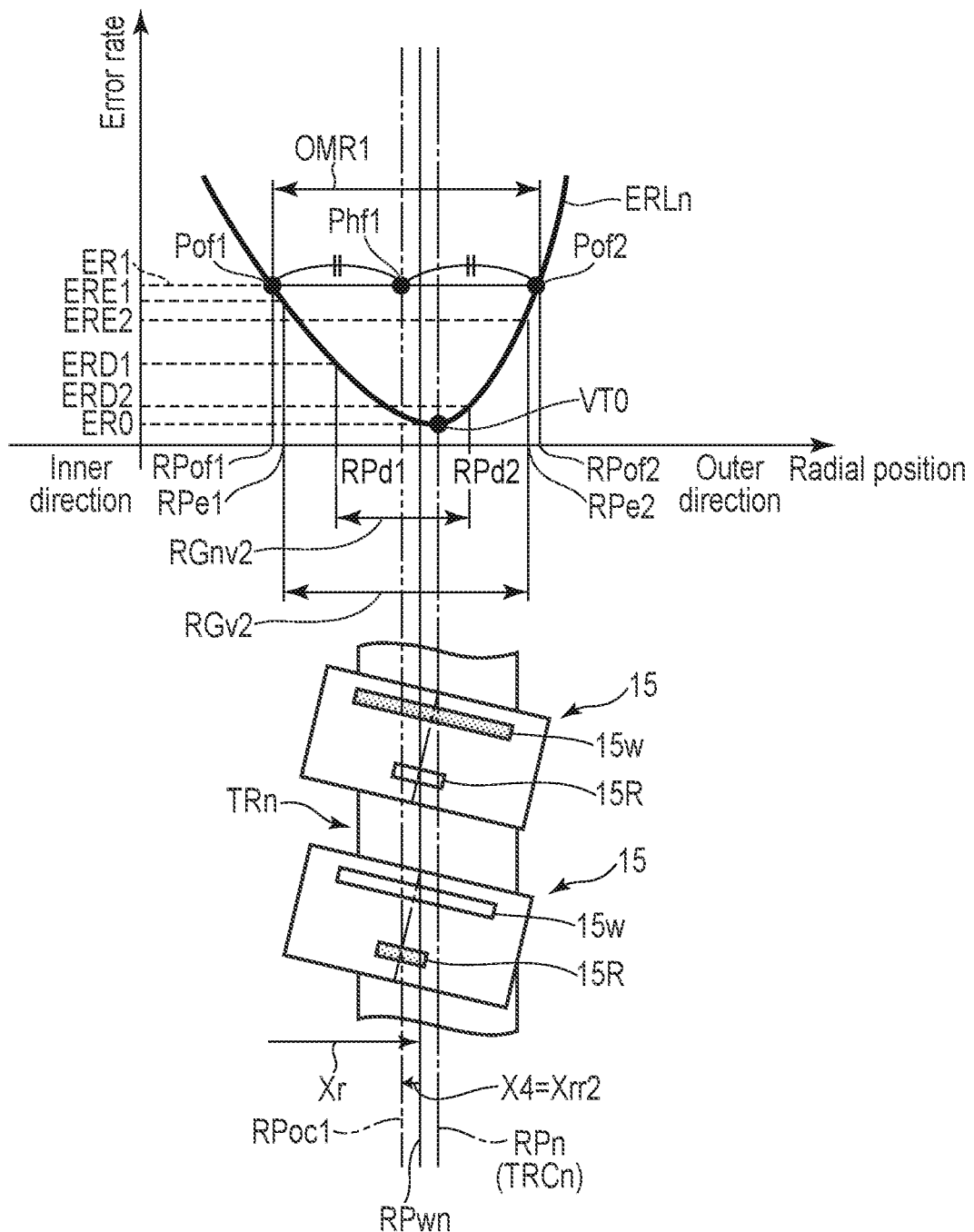
FIG. 7 is a schematic diagram illustrating an example of a change in error rate with respect to the radial position in a case where the read head is arranged at a correction read radial position according to a first embodiment.

FIG. 7 is a schematic diagram illustrating an example of the change ERLn in error rate with respect to the radial position in a case where the read head 15R is arranged at a correction read radial position according to this embodiment. FIG. 7 illustrates the track TRn. FIG. 7 corresponds to FIGS. 5 and 6. The horizontal axis of FIG. 7 represents radial positions RPof1, RPe1, RPd1, RPoc1, RPwn, RPn, RPd2, RPe2, and RPof2. The radial position RPe1 is positioned on the outside from the radial position RPof1, the radial position RPd1 is positioned on the outside from the radial position RPe1, the radial position RPoc1 is positioned on the outside from the radial position RPd1, the radial position RPwn is positioned on the outside from the radial position RPoc1, the radial position RPd2 is positioned on the outside from the radial position RPn, the radial position RPe2 is positioned on the outside from the radial position RPd2, and the radial position RPof2 is positioned on the outside from the radial position RPe2. The radial position RPn corresponds to the target read radial position. The radial position RPwn corresponds to the target write radial position. The radial position RPoc1 corresponds to the correction read radial position. The radial position RPoc1 corresponds to a radial position offset (or displaced) by an offset amount X4=Xrr2 from the radial position RPwn. FIG. 7 illustrates a range OMR1 centered on the radial position RPoc1 from the radial position RPof1 to the radial position RPof2, a range RGv2 centered on the radial position RPoc1 from the radial position RPe1 to the radial position RPe2, and a range RGnv2 centered on the radial position RPoc1 from the radial position RPd1 to the radial position RPd2. In FIG. 7, the distance from the radial position RPof1 to the radial position RPoc1 and the distance from the radial position RPoc1 to the radial position RPof2 are the same.
Incidentally, the distance from the radial position RPof1 to the radial position RPoc1 may be different from the distance from the radial position RPoc1 to the radial position RPof2. In FIG. 7, the distance from the radial position RPe1 to the radial position RPoc1 and the distance from the radial position RPoc1 to the radial position RPe2 are the same. Incidentally, the distance from the radial position RPe1 to the radial position RPoc1 may be different from the distance from the radial position RPoc1 to the radial position RPe2. In FIG. 7, the distance from the radial position RPd1 to the radial position RPoc1 and the distance from the radial position RPoc1 to the radial position RPd2 are the same. Incidentally, the distance from the radial position RPd1 to the radial position RPoc1 may be different from the distance from the radial position RPoc1 to the radial position RPd2. The range OMR1 corresponds to a radial range in which the error rate in a case where the read head 15R is arranged and reads the track TRn becomes equal to or less than the error rate threshold ER1. In other words, the range OMR1 corresponds to a radial range (or an area) in which the read head 15R can be arranged to read the track TRn. In FIG. 7, the area on the outside from the range OMR1 and the area on the inside from the range OMR1 correspond to a radial area in which the read head 15R cannot be arranged to read the track TRn. For example, the range RGv2 corresponds to a range in which the read head 15R swings or is displaced in the radial direction about the radial position RPoc1 in the case of vibration detection in a state where the read head 15R is arranged at the radial position RPoc1. For example, the range RGnv2 corresponds to a range in which the read head 15R swings or is displaced in the radial direction about the radial position RPoc1 in the case of non-vibration detection in a state where the read head 15R is arranged at the radial position RPoc1.

The vertical axis of FIG. 7 represents error rates ERD1, ERD2, ERE1, and ERE2. The error rate ERD2 is greater than the error rate ER0, the error rate ERD1 is greater than the error rate ERD2, the error rate ERE2 is greater than the error rate ERD1, the error rate ERE1 is greater than the error rate ERE2, and the error rate ER1 is greater than the error rate ERE1. The error rate ERD2 is an error rate when the read head 15R is arranged and reads at the radial position RPd2, and the error rate ERD1 is an error rate when the read head 15R is arranged and reads at the radial position RPd1, the error rate ERE2 is an error rate when the read head 15R is arranged and reads at the radial position RPe2, and the error rate ERE1 is an error rate when the read head 15R is arranged and reads at the radial position RPe1. The change ERLn in error rate in FIG. 7 shows a point Pof1 having the error rate threshold ER1 at the radial position RPof1 and a point Pof2 having the error rate threshold ER1 at the radial position RPof2. FIG. 7 shows a center point Phf1 of the straight line connecting the point Pof1 and the point Pof2.

In the example illustrated in FIG. 7, the MPU 60 arranges the read head 15R at each radial position positioned in the radial direction from the target read radial position RPn with the head 15 tilted at a particular skew angle in the outer direction, measures or detects the error rate at each radial position, and measures or detects the radial positions RPof1 and RPof2 at which the error rate becomes the error rate threshold ER1. The MPU 60 measures or detects the correction read radial position RPoc1 corresponding to the straight line which intersects, for example, is orthogonal to the straight line passing through the center of the straight line connecting points Pof1 and Pof2 and connecting the points Pof1 and Pof2. The MPU 60 calculates the correction offset amount X4=Xrr2 based on the target write radial position RPwn and the correction read radial position RPoc1. The MPU 60 may record the correction offset amount X4=Xrr2 or the correction read radial position RPoc1 associated with information of a particular sector of the track TRn, the track TRn, or the like as a table in a particular recording area such as the system area 10b of the disk 10, the volatile memory 70, the non-volatile memory 80, and the buffer memory 90.

In the example illustrated in FIG. 7, the MPU 60 arranges the read head 15R at the target read radial position RPoc1 in the case of non-vibration detection in a state where the head 15 is tilted at a particular skew angle in the outer direction, and the read head 15R reads the track TRn while swinging due to the vibration due to internal disturbance or the like in the range RGnv2 in the radial direction. In this case, the error rate in a case where the track TRn is read by the read head 15R fluctuates in a range from the error rate ER0 to the error rate ERD1 as illustrated in FIG. 7 and thus is less than the error rate threshold ER1.

In the example illustrated in FIG. 7, the MPU 60 arranges the read head 15R at the correction read radial position RPoc1 displaced by the target offset amount X4=Xrr2 from the target write radial position RPwn in the inner direction in the case of vibration detection in a state where the head 15 is tilted at a particular skew angle in the outer direction, and the read head 15R reads the track TRn while swinging due to the vibration due to external disturbance or the like in the range RGv2 in the radial direction. In this case, the error rate in a case where the track TRn is read by the read head 15R fluctuates in a range from the error rate ER0 to the error rate ERE1 and thus is less than the error rate threshold ER1. Incidentally, in the example illustrated in FIG. 7, a case is described in which the head 15 is tilted at a particular skew angle in the outer direction, but the same description may be applied to a case where the head 15 is tilted at a particular skew angle in the inner direction.

Figure 8:
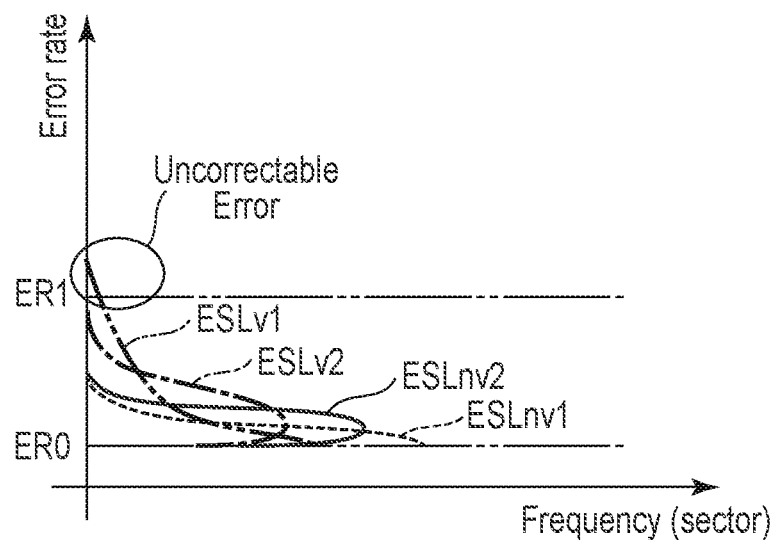
FIG. 8 is a schematic diagram illustrating an example of distribution of the error rate with respect to a frequency according to the first embodiment.

FIG. 8 is a schematic diagram illustrating an example of a frequency distribution with respect to the error rate according to this embodiment. FIG. 8 corresponds to FIGS. 5, 6 and 7. In FIG. 8, the horizontal axis represents a frequency (hereinafter, may be simply referred to as a frequency) of reading a particular area, for example, a sector, and the vertical axis represents an error rate, for example, a sector error rate. On the horizontal axis illustrated in FIG. 8, the frequency increases toward the tip side of an arrow and decreases toward the side opposite to the tip side of the arrow. On the vertical axis illustrated in FIG. 8, the error rate increases toward the tip side of an arrow and decreases toward the side opposite to the tip side of the arrow. FIG. 8 shows a distribution (hereinafter, may be simply referred to as the distribution of the error rate) ESLnv1 of the error rate with respect to the frequency in a case where the read head 15R is arranged at the target read radial position in the case of non-vibration detection in a state where the head 15 is tilted at a particular skew angle in the radial direction, and a particular sector is read while swinging in the radial direction due to internal disturbance or the like. FIG. 8 shows a distribution ESLv1 of the error rate with respect to the frequency in a case where the read head 15R is arranged at the target read radial position in the case of vibration detection in a state where the head 15 is tilted at a particular skew angle in the radial direction, and a particular sector is read while swinging in the radial direction due to external disturbance or the like. FIG. 8 shows a distribution ESLnv2 of the error rate with respect to the frequency in a case where the read head 15R is arranged at the correction read radial position in the case of non-vibration detection in a state where the head 15 is tilted at a particular skew angle in the radial direction, and a particular sector is read while swinging in the radial direction due to internal disturbance or the like. FIG. 8 shows a distribution ESLv2 of the error rate with respect to the frequency in a case where the read head 15R is arranged at the correction read radial position in the case of vibration detection in a state where the head 15 is tilted at a particular skew angle in the radial direction, and a particular sector is read while swinging in the radial direction due to external disturbance or the like.

In the example illustrated in FIG. 8, the error rate distribution ESLnv1 is distributed in the error rate equal to or less than the error rate threshold ER1, and is concentrated in the error rate ER0. The error rate distribution ESLv1 is partially distributed in the error rate greater than the error rate threshold ER1, and is concentrated in the error rate ER0.

In the example illustrated in FIG. 8, the error rate distribution ESLnv2 is distributed in the error rate equal to or less than the error rate threshold ER1, and is concentrated in the error rate on the error rate ER0 side. The error rate distribution ESLv2 is distributed in the error rate equal to or less than the error rate threshold ER1 and is concentrated in the error rate on the error rate ER0 side, and the error rate is distributed closer to the error rate threshold ER1 side compared to the error rate distribution ESLnv2.

Figure 9:
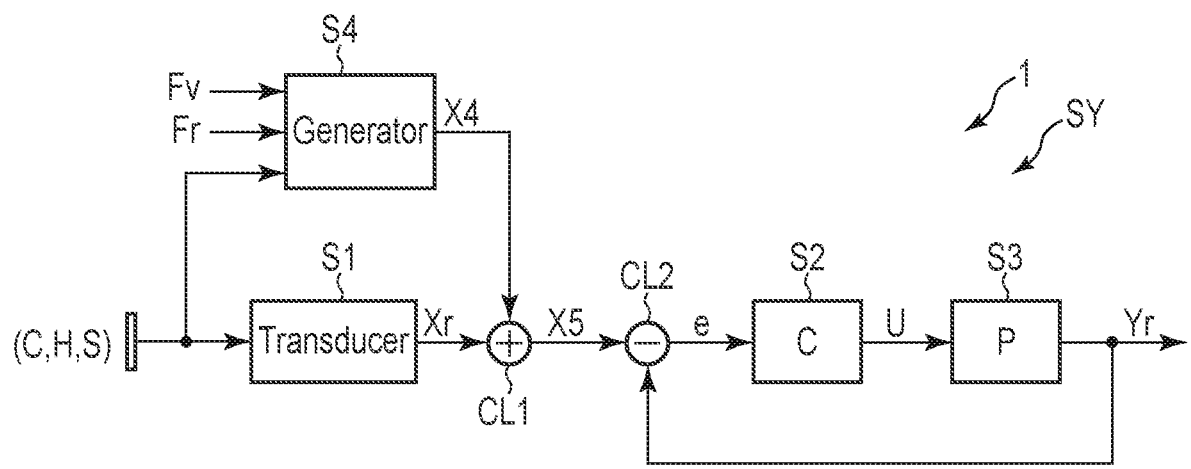
FIG. 9 is a block diagram illustrating an example of a positioning control system of the head according to the first embodiment.

FIG. 9 is a block diagram illustrating an example of a positioning control system SY of the head 15 according to this embodiment.

The magnetic disk device 1 has a positioning control system (hereinafter, may be referred to as a positioning control system) SY of the head 15. The positioning control system SY includes a transducer S1, a controller S2, an actuator S3, a generator S4, a calculator CL1, and a calculator CL2. The transducer S1, the controller S2, the actuator S3, the generator S4, the calculator CL1, and the calculator CL2 are included in, for example, the head amplifier IC 30 and the system controller 130. The actuator S3 is configured by, for example, the arm 13 and the VCM 14. The calculator CL2, the controller S2, and the actuator S3 configure a feedback system.

In FIG. 9, any one of a sector (hereinafter, may be referred to as a target sector) (C, H, S) which is a target, a target write radial position Xr in the target sector (C, H, S), an offset amount X4 corresponding to the target sector (C, H, S), a radial position (hereinafter, may be referred to as a read radial position) X5 where the read head 15R is arranged during read processing corresponding to the target sector (C, H, S), a positioning error e which is a difference between the read radial position X5 and the actual position (hereinafter, may be referred to as an actual position) of the head 15, a drive amount U of the actuator S3 in the target sector, and an actual position Yr of the head 15 in the target sector may be processed as a signal or information in the positioning control system SY. Any one of a read flag Fr for executing the read processing and a vibration state flag Fv for indicating the vibration state, for example, whether it is the case of vibration detection or non-vibration detection may be processed as a signal or information in the positioning control system SY.

The transducer S1 transduces the physical position corresponding to the logical position of the disk 10 specified by a higher-level device, for example, the host 100, to the radial position of the disk 10. For example, the transducer S1 transduces a combination (C, H, S) of a track number C of a particular track in a plurality of concentric tracks of the disk 10 for positioning the head having a head number H among the heads 15, the head number H of a particular head among a plurality of heads, a sector number S of a particular sector among a plurality of sectors of the track having the track number C from a servo information array (C: track or cylinder, S: sector) corresponding to an LBA specified by the host 100 into the target write radial position Xr in the sector having sector number S.

The controller S2 controls the actuator S3. The controller S2 generates the drive amount U of the head 15 of the actuator S3 based on the positioning error e which is a difference value between the read radial position X5, for example, the correction read radial position X5 and the actual position Yr. Incidentally, the controller S2 may generate the drive amount U based on a value other than the positioning error e.

The actuator S3 is driven according to the output of the controller S2. For example, the actuator S3 is driven based on the drive amount U and moves to the actual position Yr of the head 15 in the target sector (C, H, S).

The generator S4 produces the offset amount X4. The generator S4 generates the offset amount X4 according to the read flag Fr and the vibration state flag Fv. In a case where the read flag Fr and the vibration state flag Fv indicating the vibration detection are input, the generator S4 generates an offset amount (target offset amount) X4=Xrr1. In a case where the read flag Fr and the vibration state flag Fv indicating the non-vibration detection are input, the generator S4 generates an offset amount (correction offset amount) X4=Xrr2.

In a case where the logical position of the disk 10 where the data is read, for example, the LBA is specified by the higher-level device, for example, the host 100, the positioning control system SY converts the LBA into the physical position (C, H, S) in advance and outputs the target sector (C, H, S) to the transducer S1 and the generator S4. The target sector (C, H, S) is input to the transducer S1. The transducer S1 transduces the target sector (C, H, S) into the target write radial position (target write offset amount) Xr and outputs the target write radial position to the calculator CL1. The target sector (C, H, S) is input to the generator S4. The generator S4 outputs the offset amount X4 corresponding to the target sector (C, H, S) to the calculator CL1. The target write radial position Xr and the offset amount X4 are input to the calculator CL1. The calculator CL1 calculates the read radial position X5 by adding the target write radial position Xr and the offset amount X4, and outputs the read radial position X5 to the calculator CL2. The read radial position X5 and the actual position Yr are input to the calculator CL2. The calculator CL2 calculates the positioning error e from the difference between the read radial position X5 and the actual position Yr, and outputs the positioning error e to the controller S2. The positioning error e is input to the controller S2. The controller S2 outputs the drive amount U to the actuator S3. The drive amount U is input to the actuator S3. The actuator S3 is driven according to the drive amount U, and moves the head 15, for example, the read head 15R to the actual position Yr corresponding to the drive amount U. The actuator S3 outputs the actual position Yr to the calculator CL2.

Figure 10:
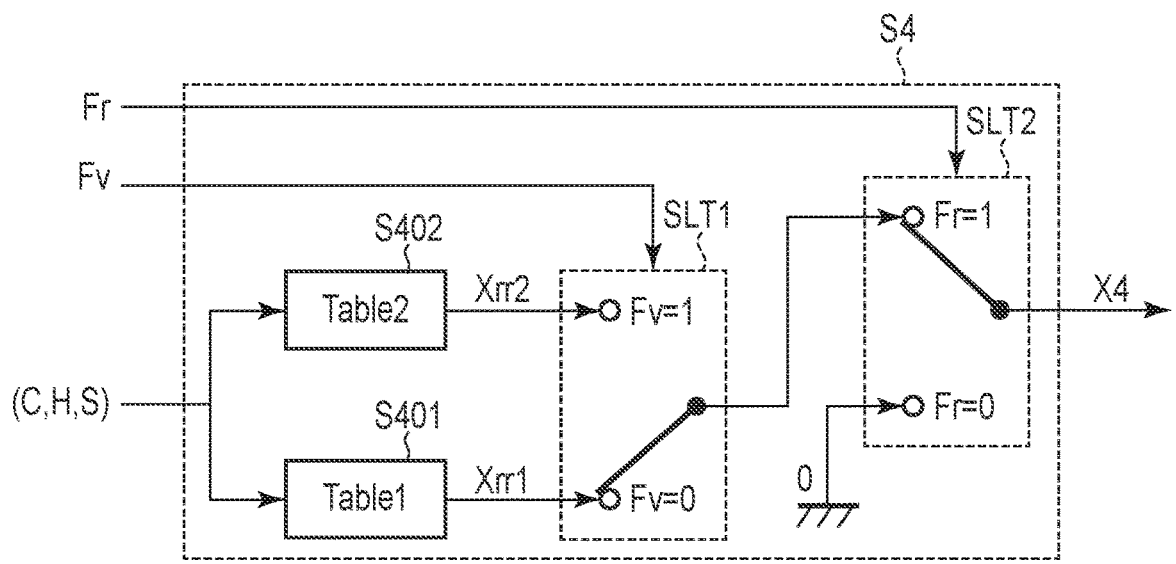
FIG. 10 is a schematic view illustrating a configuration example of a generator according to the first embodiment.

FIG. 10 is a schematic view illustrating a configuration example of the generator S4 according to this embodiment.

The generator S4 has a table S401, a table S402, a selector SLT1, and a selector SLT2.

The table S401 has each target offset amount Xrr1 for offsetting each circumferential position and each radial position of the disk 10, for example, the target write radial position corresponding to each sector of the disk 10 to the target read radial position.

The table S402 has each correction offset amount Xrr2 for offsetting each circumferential position and each radial position of the disk 10, for example, the target write radial position corresponding to each sector of the disk 10 to the correction read radial position.

The selector SLT1 selects whether to receive the target offset amount Xrr1 input from the table S401 or the correction offset amount Xrr2 input from the table S402 according to the vibration state flag Fv, and outputs the signal input from the table S401 or S402 to the selector SLT2. In a case where the vibration state flag Fv=0 indicating non-vibration detection is input, the selector SLT1 selects to receive the target offset amount Xrr1 input from table S401, and outputs the target offset amount Xrr1 input from the table S401 to the selector SLT2. In a case where the vibration state flag Fv=1 indicating vibration detection is input, the selector SLT1 selects to receive the correction offset amount Xrr2 input from table S402, and outputs the correction offset amount Xrr2 input from the table S402 to the selector SLT2.

The selector SLT2 selects whether to receive the signal input from the selector SLT1 or not to receive the signal input from the selector SLT1 according to the read flag. In a case where the read flag Fr=0 is input, that is, a case where the read processing is not executed, the selector SLT2 does not receive the signal input from the selector SLT1 and does not output the offset amount X4. In a case where the read flag Fr=1 is input, that is, a case where the read processing is executed, the selector SLT2 receives the signal input from the selector SLT1 and outputs the signal input from the selector SLT1 as the offset amount X4.

The target sector (C, H, S) is input to the generator S4. In the table S401, the target sector (C, H, S) is input, and the target offset amount Xrr1 corresponding to the target sector (C, H, S) is output to the selector SLT1. In the table S402, the target sector (C, H, S) is input, and the correction offset amount Xrr2 corresponding to the target sector (C, H, S) is output to the selector SLT1. In the selector SLT1, the target offset amount Xrr1 is input from the table S401, the correction offset amount Xrr2 is input from the table S402, and the target offset amount Xrr1 or the correction offset amount Xrr2 is output according to the vibration state flag Fv. In the selector SLT2, the target offset amount Xrr1 or the correction offset amount Xrr2 is input from the selector SLT1, whether to execute the read processing (Fr=1) or not to execute the read processing (Fr=0) is selected according to the read flag Fr, and the target offset amount Xrr1 or the correction offset amount Xrr2 is output as the offset amount X4 in a case where the read processing is executed. In other words, in the selector SLT2, the target offset amount Xrr1 or the correction offset amount Xrr2 is input from the selector SLT1, whether to execute the read processing (Fr=1) or to execute the write processing (Fr=0) is selected according to the read flag Fr, and the target offset amount Xrr1 or the correction offset amount Xrr2 is output as the offset amount X4 in a case where the read processing is executed.

Figure 11:
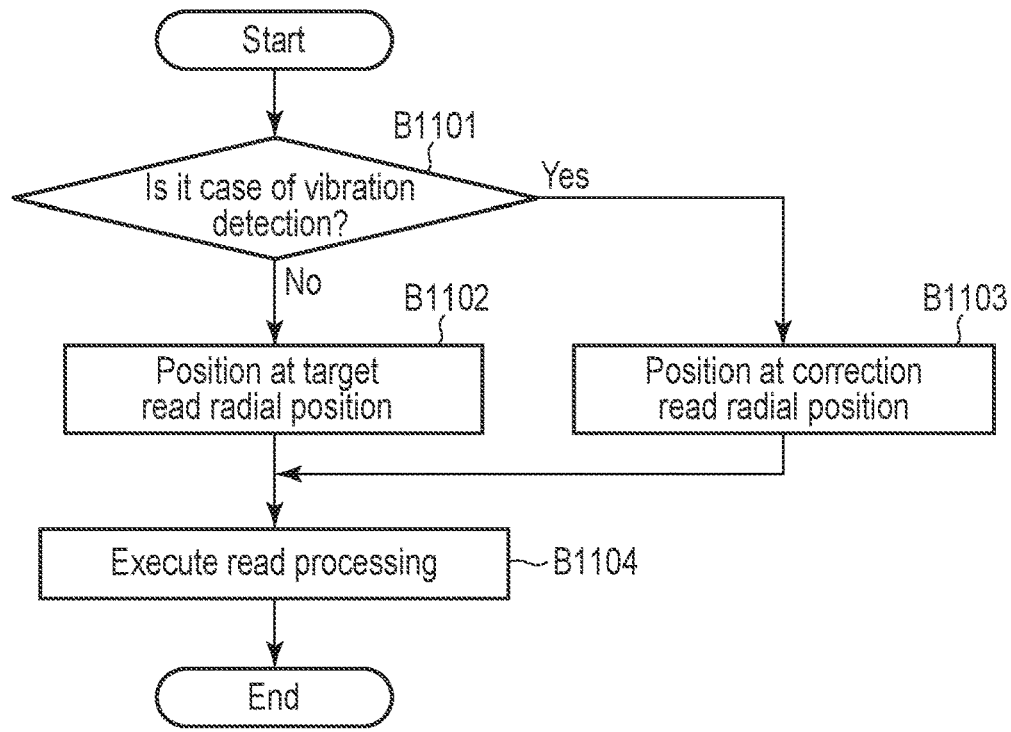
FIG. 11 is a flowchart illustrating an example of a read processing method according to the first embodiment.

FIG. 11 is a flowchart illustrating an example of a read processing method according to this embodiment.

The MPU 60 determines whether it is the case of vibration detection or not the case of vibration detection (B1101). In other words, the MPU 60 determines whether it is the case of vibration detection or non-vibration detection. For example, the MPU 60 determines whether it is the case of vibration detection or non-vibration detection in a state where the head 15 is tilted at a particular skew angle. In a case where it is determined that it is the case of non-vibration detection (NO in B1101), the MPU 60 positions the read head 15R at the target read radial position (B1102) and proceeds to the process of B1104. In a case where it is determined that it is the case of vibration detection (YES in B1101), the MPU 60 positions the read head 15R at the correction read radial position (B1103), executes the read processing (B1104), and ends the processing.

According to this embodiment, the magnetic disk device 1 positions the read head 15R at the target read radial position or the correction read radial position according to the vibration state, and executes the read processing. The magnetic disk device 1 positions the read head 15R at the correction read radial position in the case of vibration detection in a state where the head 15 is tilted at a particular skew angle, and executes the read processing. The magnetic disk device 1 positions the read head 15R at the target read radial position in the case of non-vibration detection in a state where the head 15 is tilted at a particular skew angle, and executes the read processing. Therefore, the magnetic disk device 1 can improve a read performance.

Next, the magnetic disk device according to another embodiment according to the above-described embodiment will be described. In another embodiment, the same parts as those in the above-described embodiment are designated by the same reference numerals, and detailed description thereof will be omitted.

Second Embodiment

A magnetic disk device 1 according to a second embodiment is different from the magnetic disk device 1 of the first embodiment described above in the write/read processing method.

A write controller 610 writes information (hereinafter, may be referred to as vibration write information) indicating that writing is performed in a state where a vibration equal to or higher than the vibration threshold is applied according to the vibration state.

In a case where a particular sector is written in the case of vibration detection, the write controller 610 records the vibration write information in association with the sector in a particular recording area such as a sector (data sector), a disk 10, a volatile memory 70, and a non-volatile memory 80. In a case where a particular sector is written in the case of vibration detection, the write controller 610 records the vibration write information in association with the Logical Block Address (LBA) of the sector in a particular recording area such as the sector (data sector), the disk 10, the volatile memory 70, and the non-volatile memory 80. In a case where a particular sector is written in the case of non-vibration detection, the write controller 610 does not record the vibration write information.

In a case where a particular data, for example, a particular sector is read, and the vibration write information corresponding to the sector is detected in a particular recording area such as the sector, the disk 10, the volatile memory 70, and the non-volatile memory 80, a read controller 620 arranges a read head 15R at the correction read radial position and reads the data, for example, the sector. For example, in a case where a particular sector is read, and the vibration write information is written in the sector, the read controller 620 arranges the read head 15R at the correction read radial position and reads the sector. In a case where a particular data, for example, a particular sector is read, and the vibration write information corresponding to the sector cannot be detected in a particular recording area such as the sector, the disk 10, the volatile memory 70, and the non-volatile memory 80, the read controller 620 arranges the read head 15R at the target read radial position and reads the data, for example, the sector. For example, in a case where a particular sector is read, and the vibration write information is not written in the sector, the read controller 620 arranges the read head 15R at the target read radial position and reads the sector.

Figure 12:
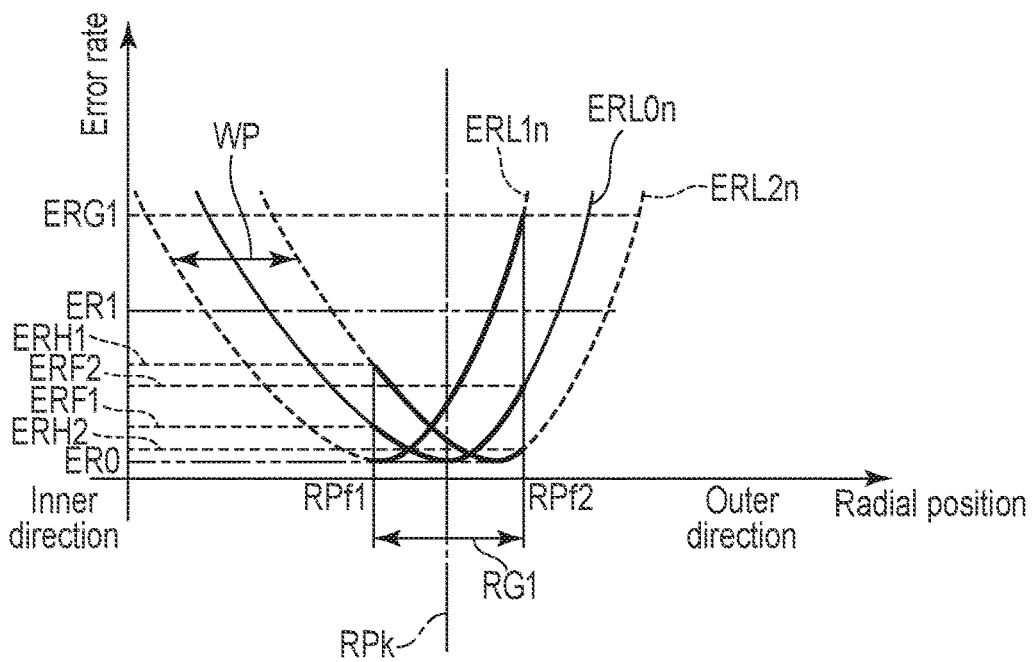
FIG. 12 is a schematic diagram illustrating an example of a change in error rate with respect to the radial position in a case where the read head is arranged at the target read radial position.

FIG. 12 is a schematic diagram illustrating an example of changes $ERL0n$, $ERL1n$, and $ERL2n$ in error rate with respect to the radial position in a case where the read head 15R is arranged at the target read radial positions RPk. The horizontal axis of FIG. 12 represents radial positions RPf1, RPk, and RPf2. The radial position RPk is positioned on the outside from the radial position RPf1, and the radial position RPf2 is positioned on the outside from the radial position RPk. The radial position RPk corresponds to the target read radial position. FIG. 12 illustrates a range RG1 centered on the radial position RPk from the radial position RPf1 to the radial position RPf2. In FIG. 12, the distance from the radial position RPf1 to the radial position RPk and the distance from the radial position RPk to the radial position RPf2 are the same. Incidentally, the distance from the radial position RPf1 to the radial position RPk may be different from the distance from the radial position RPk to the radial position RPf2. For example, in a case where the read head 15R is arranged at the radial position RPn, the range RG1 corresponds to a range in which the read head 15R swings or is displaced in the radial direction about the radial position RPn. Further, a width WP corresponds to a width at which the write head 15 swings in the radial direction at the time of writing.

The vertical axis of FIG. 12 represents error rates ERF1, ERF2, ERH1, ERH2, and ERG1. The error rate ERH2 is greater than the error rate ER0, the error rate ERF1 is greater than the error rate ERH2, the error rate ERF2 is greater than the error rate ERF1, the error rate ERH1 is greater than the error rate ERF2, the error rate ER1 is greater than the error rate ERH1, and the error rate ERG1 is greater than the error rate ER1. FIG. 12 illustrates the change $ERL0n$ in error rate with respect to the radial position in a case where the write head 15W is arranged at the target write head radial position RPk and writes a particular sector or a particular track, the change $ERL1n$ in error rate with respect to the radial position in a case where the write head 15W is arranged at the radial position RPk−WP/2 separate from the target write head radial position RPk in the outer direction and writes a particular sector or a particular track, and the change $ERL2n$ in error rate with respect to the radial position in a case where the write head 15W is arranged at the radial position RPk+WP/2 separate from the target write head radial position RPk in the inner direction and writes the particular sector or a particular track. Incidentally, the change $ERL1n$ in error rate may be a change in error rate with respect to the radial position in a case where the write head 15W is arranged at the radial position RPk+WP/2 separate from the target write head radial position RPk in the outer direction and writes the particular sector or a particular track. The change $ERL2n$ in error rate may be a change in error rate with respect to the radial position in a case where the write head 15W is arranged at the radial position RPk−WP/2 separate from the target write head radial position RPk in the inner direction and writes the particular sector or a particular track. The change $ERL0n$ in error rate includes the error rate ERF1 at the radial position RPf1, the error rate ER0 at the radial position RPk, and the error rate ERF2 at the radial position RPf2. The change $ERL1n$ in error rate includes the error rate ER0 at the radial position RPf1 and the error rate ERG1 at the radial position RPf2. The change $ERL2n$ in error rate includes the error rate ERH1 at the radial position RPf1 and the error rate ERH2 at the radial position RPf2.

In the example illustrated in FIG. 12, in an MPU 60, in a case where the write head 15W to which a vibration is applied due to external disturbance or the like is arranged at the radial position RPk and writes a particular sector with the head 15 tilted at a particular skew angle in the radial direction, the write head 15W writes a plurality of pieces of data corresponding to the respective changes $ERL0n$, $ERL1n$, and $ERL2n$ in error rate while swinging in the radial direction.

In the example illustrated in FIG. 12, the MPU 60 arranges the read head 15R at the target read radial position with the head 15 tilted at a particular skew angle in the radial direction, and the read head 15R reads a particular sector while swinging due to the vibration in the range RG1 in the radial direction. In this case, the error rate in a case where a plurality of pieces of data corresponding to respective changes $ERL0n$, $ERL1n$, and $ERL2n$ in error rate are read fluctuates in a range from the error rate ER0 to the error rate ERG1 and thus may be greater than the error rate threshold ER1.

Figure 13:
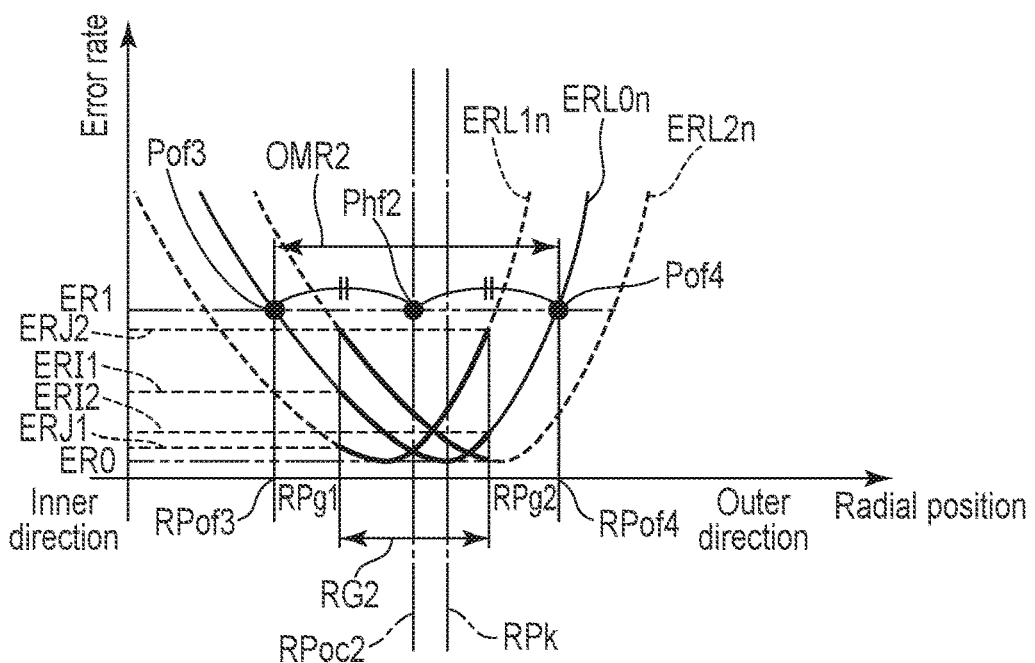
FIG. 13 is a schematic view illustrating an example of a change in error rate with respect to the radial position in a case where the read head is arranged at the correction read radial position according to a second embodiment.

FIG. 13 is a schematic diagram illustrating an example of the changes $ERL0n$, $ERL1n$, and $ERL2n$ in error rate with respect to the radial position in a case where the read head 15R is arranged at the correction read radial position RPoc2 according to this embodiment. FIG. 13 corresponds to FIG. 12. The horizontal axis of FIG. 13 represents radial positions RPof3, RPg1, RPoc2, RPk, RPg2, and RPof4. The radial position RPg1 is positioned on the outside from the radial position RPof3, the radial position RPoc2 is positioned on the outside from the radial position RPg1, the radial position RPk is positioned on the outside from the radial position RPoc2, the radial position RPg2 is positioned on the outside from the radial position RPk, and the radial position RPof4 is positioned on the outside from the radial position RPf2. The radial position RPk corresponds to the target read radial position. The radial position RPoc2 corresponds to the correction read radial position. FIG. 13 illustrates a range OMR2 centered on the radial position RPoc2 from the radial position RPof3 to the radial position RPof4 and a range RG2 centered on the radial position RPoc2 from the radial position RPg1 to the radial position RPg2. In FIG. 13, the distance from the radial position RPof3 to the radial position RPoc2 and the distance from the radial position RPoc2 to the radial position RPof4 are the same. Incidentally, the distance from the radial position RPof3 to the radial position RPoc2 may be different from the distance from the radial position RPoc2 to the radial position RPof4. In FIG. 13, the distance from the radial position RPg1 to the radial position RPoc2 and the distance from the radial position RPoc2 to the radial position RPg2 are the same. Incidentally, the distance from the radial position RPg1 to the radial position RPoc2 may be different from the distance from the radial position RPoc2 to the radial position RPg2. The range OMR2 corresponds to a radial range in which the error rate in a case where the read head 15R is arranged and reads a particular sector or a particular track becomes equal to or less than the error rate threshold ER1. In other words, the range OMR2 corresponds to a radial range (or area) in which a particular sector or a particular track can be read. In FIG. 13, the area on the outside from the range OMR2 and the area on the inside from the range OMR2 correspond to a radial area in which the read head 15R cannot be arranged to read a particular sector or a particular track. For example, in a case where the read head 15R is arranged at the radial position RPoc2, the range RG2 corresponds to a range in which the read head 15R swings or is displaced in the radial direction about the radial position RPoc2.

The vertical axis of FIG. 13 represents error rates ERI1, ERI2, ERJ1, and ERJ2. The error rate ERJ1 is greater than the error rate ER0, the error rate ERI2 is greater than the error rate ERJ1, the error rate ERI1 is greater than the error rate ERI2, the error rate ERJ2 is greater than the error rate ERI1, and the error rate ER1 is greater than the error rate ERJ2. In FIG. 13, the change $ERL0n$ in error rate includes the error rate ERI1 at the radial position RPg1 and the error rate ERI2 at the radial position RPg2. The change $ERL1n$ in error rate includes the error rate ERJ1 at the radial position RPg1 and the error rate ERJ2 at the radial position RPg2. The change $ERL2n$ in error rate includes the error rate ERJ2 at the radial position RPg1 and the error rate ER0 at the radial position RPg2. The change $ERL0n$ in error rate in FIG. 13 shows a point Pof3 having the error rate threshold ER1 at the radial position RPof3 and a point Pof4 having the error rate threshold ER1 at the radial position RPof4. FIG. 13 shows a center point Phf2 of the straight line connecting the point Pof3 and the point Pof4.

In the example illustrated in FIG. 13, the MPU 60 arranges the read head 15R at each radial position positioned in the radial direction from the target read radial position RPk with the head 15 tilted at a particular skew angle in the radial direction, measures or detects the error rate at each radial position, and measures or detects the correction read radial position RPoc2 at which the error rate corresponding to each radial position of the range RG2 becomes equal to or less than the error rate threshold ER1. The MPU 60 may record the correction offset amount or the correction read radial position RPoc2 associated with information of a particular sector, a particular track, or the like as a table in a particular recording area such as the system area 10b of the disk 10, the volatile memory 70, the non-volatile memory 80, and the buffer memory 90.

In the example illustrated in FIG. 13, in a case where a particular sector is read with the head 15 tilted at a particular skew angle in the radial direction, and the vibration write information corresponding to the sector is not detected in the sector, the MPU 60 arranges the read head 15R at the target read radial position RPk and reads the sector. In this case, the error rate in the case of reading a plurality of pieces of data in which the change in error rate is almost the same as that of $ERL0n$ fluctuates in a range from the error rate ER0 to the error rate ERF2 as illustrated in FIG. 12 and thus is less than the error rate threshold ER1.

In the example illustrated in FIG. 13, in a case where a particular sector is read with the head 15 tilted at a particular skew angle in the radial direction, and the vibration write information corresponding to the sector is detected from the sector, the MPU 60 arranges the read head 15R at the correction read radial position RPoc2 and reads the sector. In this case, the error rate in a case where a plurality of pieces of data corresponding to respective changes $ERL0n$, $ERL1n$, and $ERL2n$ in error rate are read fluctuates in a range from the error rate ER0 to the error rate ERJ2 and thus is less than the error rate threshold ER1.

Figure 14:
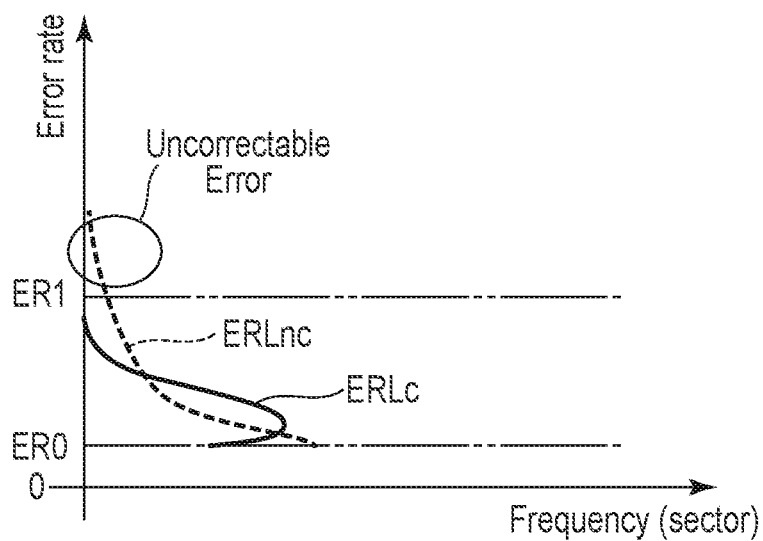
FIG. 14 is a schematic diagram illustrating an example of distribution of the error rate with respect to a frequency according to the second embodiment.

FIG. 14 is a schematic diagram illustrating an example of a frequency distribution with respect to the error rate according to the second embodiment. FIG. 14 corresponds to FIGS. 12 and 13. In FIG. 14, the horizontal axis represents a frequency and the vertical axis represents an error rate, for example, a sector error rate. On the horizontal axis illustrated in FIG. 14, the frequency increases toward the tip side of an arrow and decreases toward the side opposite to the tip side of the arrow. On the vertical axis illustrated in FIG. 14, the error rate increases toward the tip side of an arrow and decreases toward the side opposite to the tip side of the arrow. FIG. 14 shows a distribution (hereinafter, may be simply referred as to the distribution of the error rate) ESLnc of the error rate with respect to the frequency in a case where the data written by the write head 15W swinging in the radial direction in the case of vibration detection is read by the read head 15R arranged at the target read radial position and a distribution ESLnc of the error rate with respect to the frequency in a case where the data written by the write head 15W swinging in the radial direction in the case of vibration detection is read by the read head 15R arranged at the correction read radial position.

In the example illustrated in FIG. 14, the error rate distribution ESLnc is partially distributed in the error rate equal to or greater than the error rate threshold ER1, and is concentrated in the error rate ER0.

In the example illustrated in FIG. 14, the error rate distribution ESLc is distributed in the error rate equal to or less than the error rate threshold ER1 and is concentrated in the error rate on the error rate ER0 side, and the error rate is distributed closer to the error rate threshold ER1 side compared to the error rate distribution ESLnc.

Figure 15:
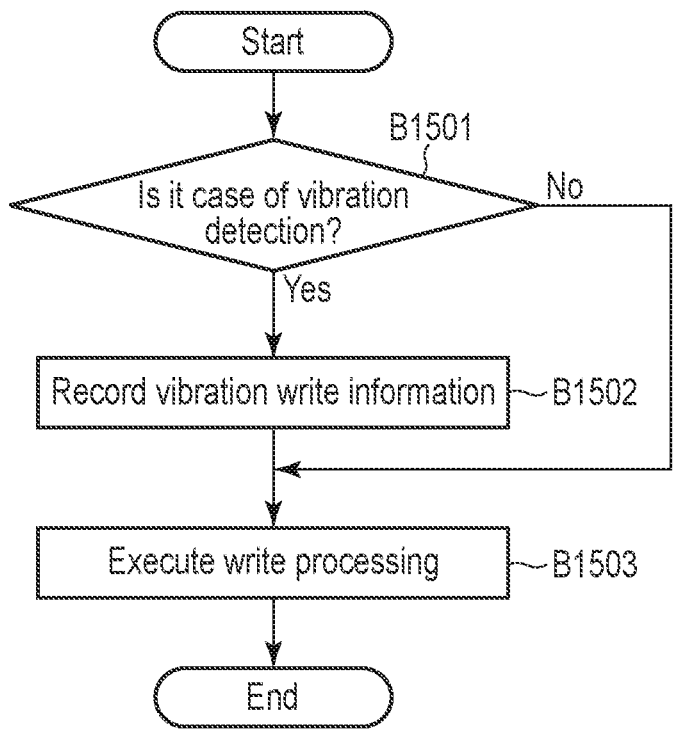
FIG. 15 is a flowchart illustrating an example of a write processing method according to the second embodiment.

FIG. 15 is a flowchart illustrating an example of a write processing method according to the second embodiment.

The MPU 60 determines whether it is the case of vibration detection or not the case of vibration detection (B1501). In other words, the MPU 60 determines whether it is the case of vibration detection or non-vibration detection. In a case where it is determined that it is the case of non-vibration detection (NO in B1501), the MPU 60 proceeds to the process of B1503. In a case where it is determined that it is the case of vibration detection (YES of B1501), the MPU 60 records the vibration write information in a particular recording area such as a particular sector, the disk 10, the volatile memory 70, the non-volatile memory 80, or the like (B1502), execute the write processing (B1503), and ends the processing.

Figure 16:
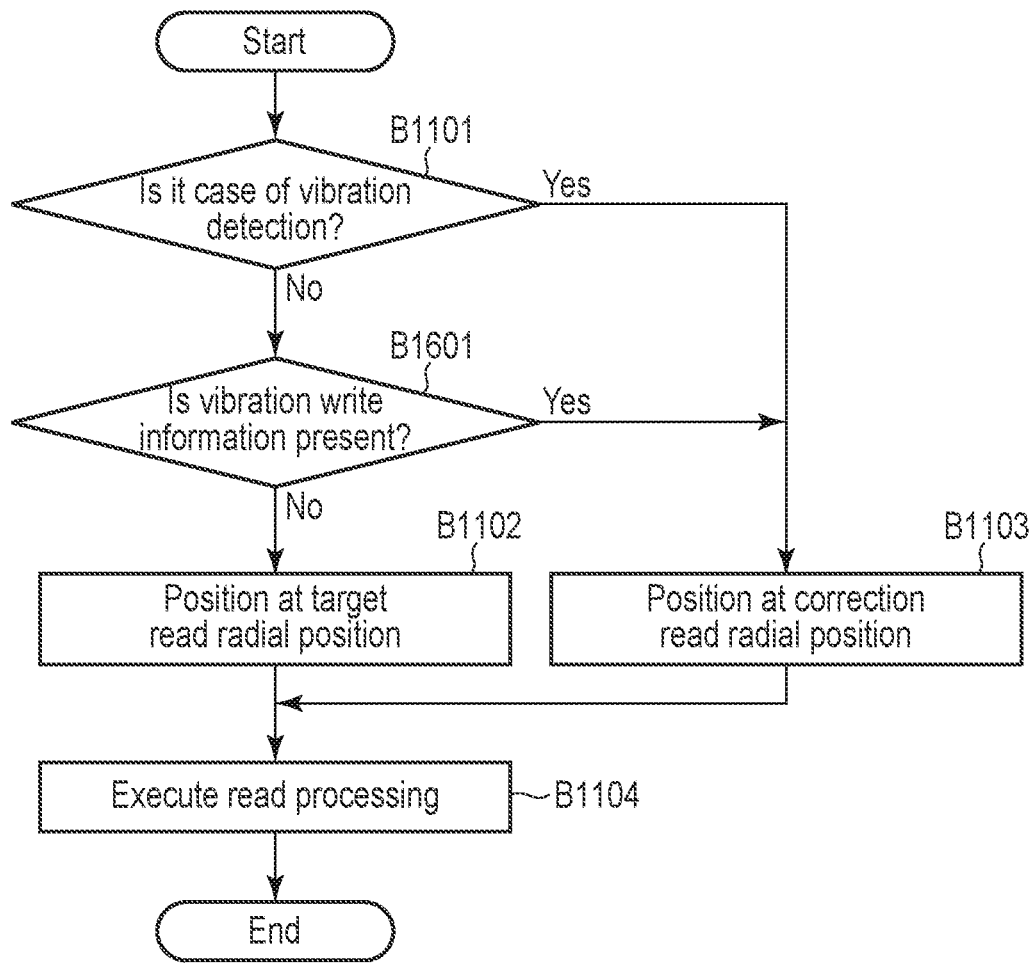
FIG. 16 is a flowchart illustrating an example of a read processing method according to the second embodiment.

FIG. 16 is a flowchart illustrating an example of a read processing method according to the second embodiment.

The MPU 60 determines whether it is the case of vibration detection or not the case of vibration detection (B1101). In a case where it is determined that it is the case of vibration detection (YES in B1101), the MPU 60 proceeds to the process of B1103. In a case where it is determined that it is the case of non-vibration detection (NO of B1101), the MPU 60 determines whether the vibration write information is present or not (B1601). For example, in a case where it is determined that it is the case of non-vibration detection, the MPU 60 determines whether or not the vibration write information corresponding to (the LBA) of the read sector is recorded in a particular recording area such as the read sector, the disk 10, the volatile memory 70, and the non-volatile memory 80. In a case where it is determined that the vibration write information is not present (NO in B1601), the MPU 60 positions the read head 15R at the target read radial position (B1102) and proceeds to the process of B1104. In a case where it is determined that the vibration write information is present (YES in B1601), the MPU 60 positions the read head 15R at the correction read radial position (B1103), executes the read processing (B1104), and ends the processing.

According to the second embodiment, the magnetic disk device 1 records the vibration write information in a particular recording area in the case of vibration detection in the write processing. In a case where a particular sector is read, and the vibration write information corresponding to the sector is detected from the sector, the magnetic disk device 1 arranges the read head 15R at the correction read radial position corresponding to the sector and reads the sector. In a case where a particular sector is read, and the vibration write information corresponding to the sector cannot be detected from the sector, the magnetic disk device 1 arranges the read head 15R at the target read radial position corresponding to the sector and reads the sector. Therefore, the magnetic disk device 1 can improve a read performance.

Third Embodiment

A magnetic disk device 1 according to a third embodiment is different from the above-described first and second embodiments in that the magnetic disk device is a two-dimensional magnetic recording (TDMR) type magnetic disk device having a head 15 on which a plurality of read heads 15R are mounted.

FIG. 17 is a block diagram illustrating a configuration of the magnetic disk device 1 according to the third embodiment.

For example, the magnetic disk device 1 is a two-dimensional magnetic recording (TDMR) type magnetic disk device.

A read head 15R has a plurality of read heads 15R, for example, two read heads 15R1 and 15R2. For example, the read head 15R2 is provided at the position farthest from the write head 15W. For example, the read head 15R1 is provided at the position next farthest from the write head 15W after the read head 15R2. In other words, the read head 15R1 is positioned between the write head 15W and the read head 15R2. Incidentally, the read head 15R may have three or more read heads. The write head 15W, the read head 15R1 and the read head 15R2 may be arranged in an order other than the above-described order. A plurality of read heads 15R, for example, two read heads 15R1 and 15R2 may be collectively referred to as the read head 15R, and any one of a plurality of read heads 15R, for example, the read heads 15R1 and 15R2 may be simply referred to as the read head 15R. Hereinafter, among the plurality of read heads 15R, the read head 15R which serves as a reference for positioning during read processing may be referred to as a main read head 15R or a primary read head 15R. Further, the read head 15R other than the main read head 15R among the plurality of read heads 15R may be referred to as a sub read head 15R or a secondary read head 15R.

Figure 18:
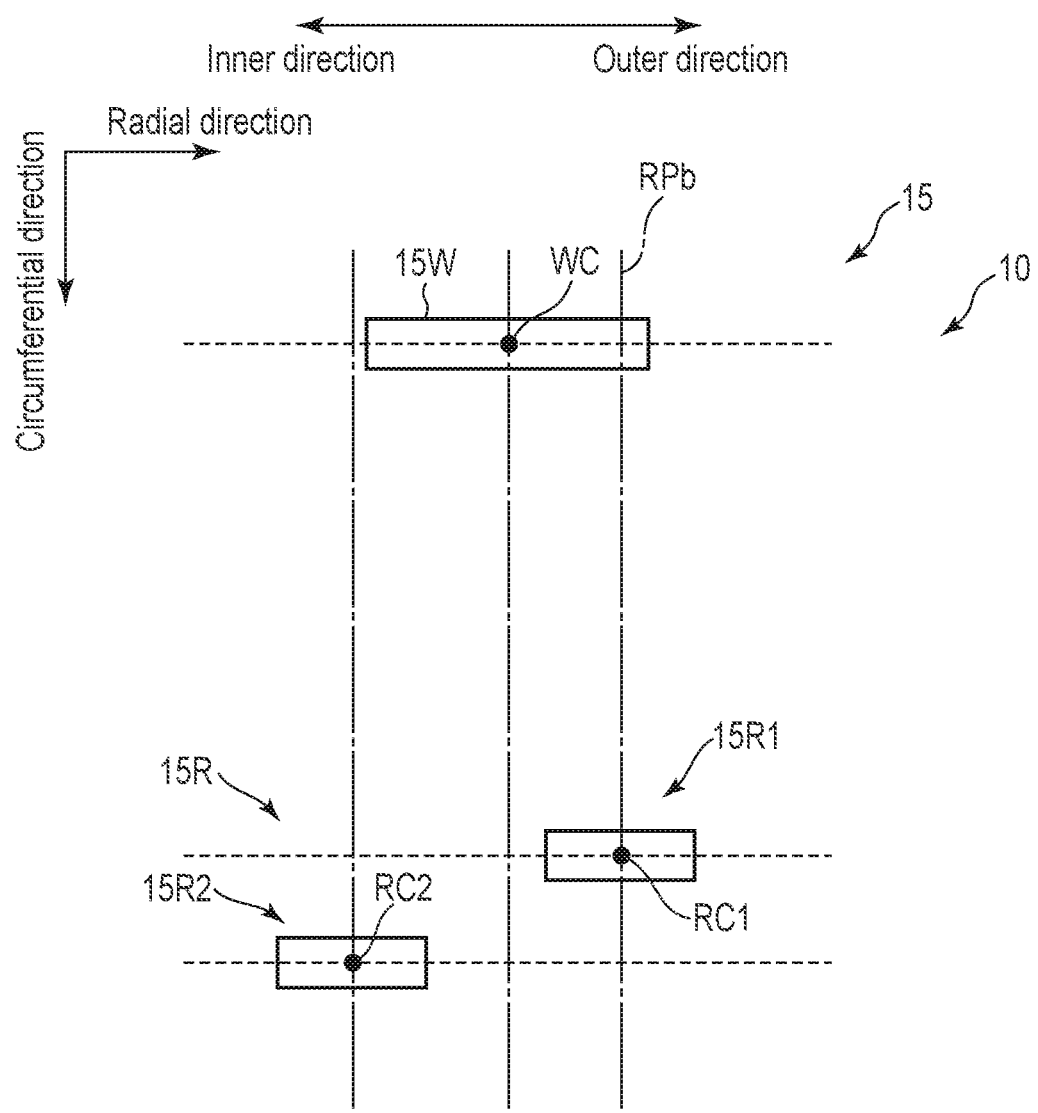
FIG. 18 is a schematic view illustrating an example of a geometric arrangement of a write head and two read heads in a case where the read head is arranged at a reference position.

FIG. 18 is a schematic view illustrating an example of the geometric arrangement of the write head 15W and the two read heads 15R1 and 15R2 in a case where the read head 15R1 is arranged at a reference position RPb. In FIG. 18, the read head 15R1 corresponds to the main read head 15R1 and the read head 15R2 corresponds to the sub read head 15R2. FIG. 18 illustrates a central portion RC1 of the read head (main read head) 15R1 and a central portion RC2 of the read head (sub read head) 15R2. Hereinafter, a circumferential interval between the central portion RC1 of the read head 15R1 and the central portion RC2 of the read head 15R2 may be referred to as a down track separation (DTS). Further, a radial interval between the central portion RC1 of the read head 15R1 and the central portion RC2 of the read head 15R2 may be referred to as a cross track separation (CTS).

In the example illustrated in FIG. 18, the write head 15W, the read head 15R1, and the read head 15R2 are not aligned in the circumferential direction in a case where the read head 15R1 is arranged at the reference position RPb. In a case where the read head 15R1 is arranged at the reference position RPb, the read head 15R1 is positioned on the outside from the write head 15W. In a case where the read head 15R1 is arranged at the reference position RPb, the read head 15R2 is positioned on the inside from the write head 15W. The write head 15W and the read head 15R1 are provided apart from each other in the circumferential direction. The read head 15R1 and the read head 15R2 are provided apart from each other in the circumferential direction.

Figure 19:
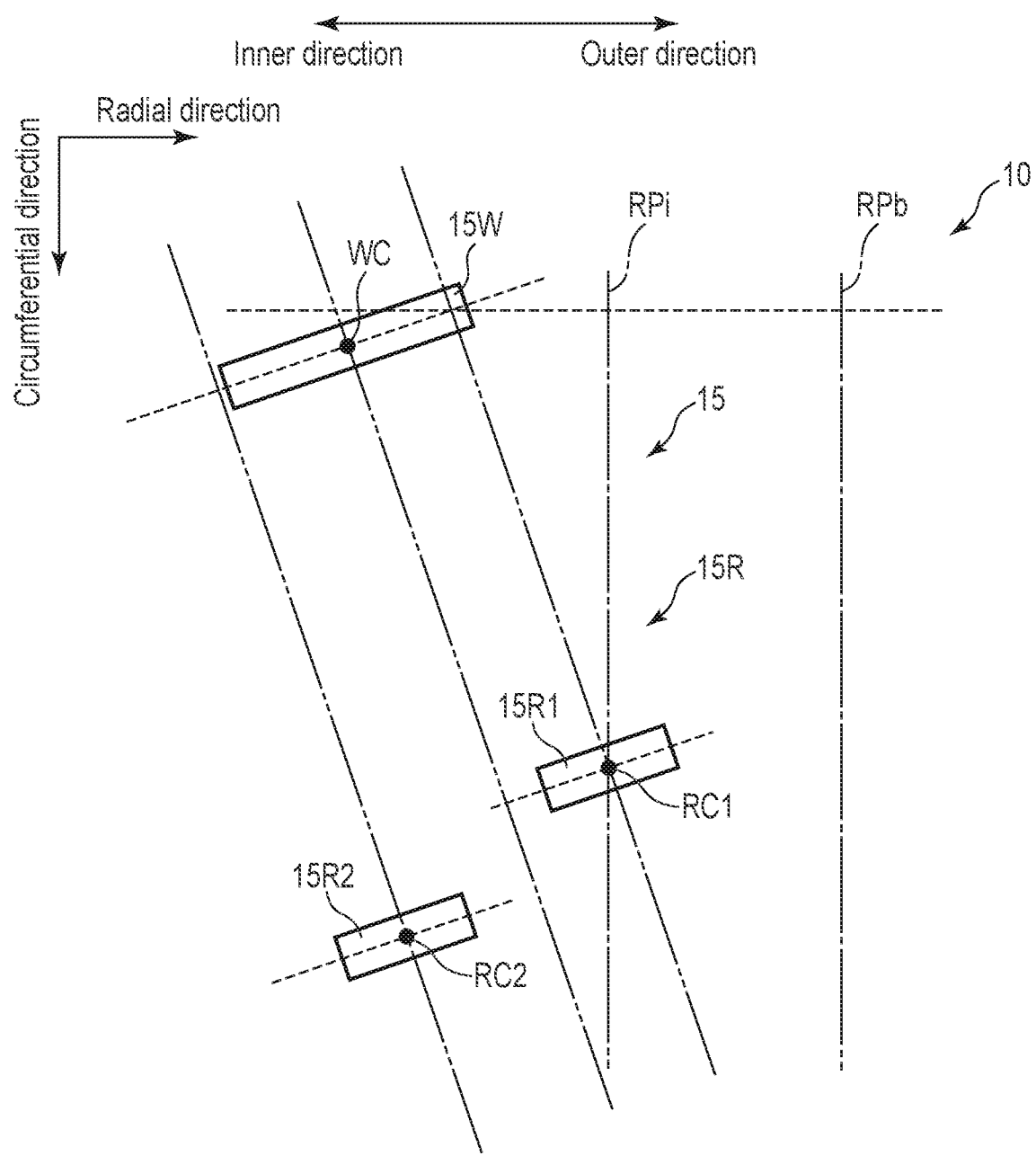
FIG. 19 is a diagram illustrating an example of the geometric arrangement of the write head and two read head in a case where the read head is arranged at a radial position.

FIG. 19 is a diagram illustrating an example of the geometric arrangement of the write head 15W and the two read heads 15R1 and 15R2 in a case where the read head 15R1 is arranged at a radial position RPi. FIG. 19 corresponds to FIG. 18.

In the example illustrated in FIG. 19, in a case where the main read head 15R1 is arranged at the radial position RPi, the head 15 is tilted in the inner direction of the radial direction with a particular skew angle. In FIG. 19, in a case where the main read head 15R1 is arranged at the radial position RPi, the write head 15W, the main read head 15R1, and the sub read head 15R2 are tilted a particular skew angle in the inner direction of the radial direction from a state where the main read head 15R1 is arranged at the reference position RPb.

Incidentally, even in a case where the main read head 15R1 is arranged at the radial position RPo in FIG. 2, similarly to a case where the main read head 15R1 is arranged at the radial position RPi, the write head 15W and the two read heads 15R1 and 15R2 are tilted at a particular skew angle in the outer direction of the radial direction from a state where the main read head 15R1 is arranged at the reference position RPb in FIG. 2.

Figure 20:
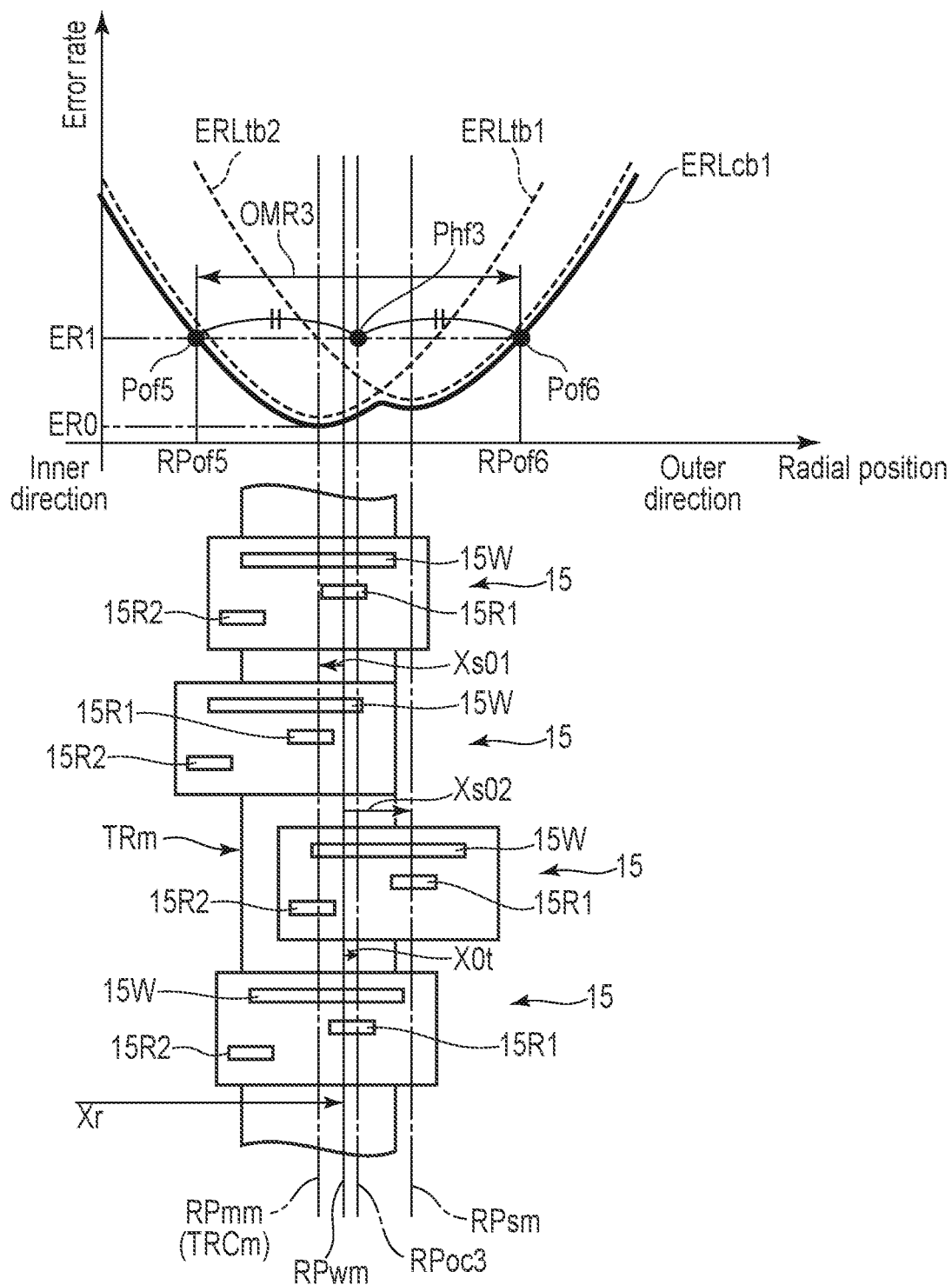
FIG. 20 is a schematic view illustrating an example of a change in error rate with respect to the radial position in a case where the read head is arranged at the correction read radial position according to a third embodiment.

FIG. 20 is a schematic diagram illustrating an example of a change ERLcb1 in error rate with respect to the radial position in a case where the read head 15R is arranged at a correction read radial position RPoc3 according to the third embodiment. FIG. 20 shows a track TRm. The horizontal axis of FIG. 20 represents radial positions RPof5, RPmm, RPwm, RPoc3, RPsm, and RPof6. The radial position RPmm is positioned on the outside from the radial position RPof5, the radial position RPwm is positioned on the outside from the radial position RPmm, the radial position RPoc3 is positioned on the outside from the radial position RPwm, the radial position RPsm is positioned on the outside from the radial position RPoc3, and the radial position RPof6 is positioned on the outside from the radial position RPsm. The radial position RPmm corresponds to a track center TRCm of the track TRm. The radial position RPmm corresponds to the target write head radial position. The radial position RPmm corresponds to the target read radial position. The radial position RPwm corresponds to the target write radial position which is the target read head radial position of the read head 15R1 for positioning the write head 15W at the radial position RPmm. For example, the radial position RPwm may correspond to the reference position RPb. The radial position RPoc3 corresponds to the correction read radial position. The radial position RPmm corresponds to the radial position offset (or displaced) in the inner direction by an offset amount Xs01 from the radial position RPwm. The radial position RPoc3 corresponds to a radial position offset (or displaced) in the outer direction by an offset amount X0t from the radial position RPwm. The radial position RPsm corresponds to a radial position offset (or displaced) in the outer direction by an offset amount Xs02 from the radial position RPwm. FIG. 20 illustrates a range OMR3 centered on the radial position RPoc3 from the radial position RPof5 to the radial position RPof6. In FIG. 20, a distance from the radial position RPof5 to the radial position RPoc3 and a distance from the radial position RPoc3 to the radial position RPof6 are the same. Incidentally, the distance from the radial position RPof5 to the radial position RPoc3 may be different from the distance from the radial position RPoc3 to the radial position RPof6. The range OMR3 corresponds to a radial range in which the error rate in a case where the read head 15R is arranged and reads the track TRm becomes equal to or less than the error rate threshold ER1. In other words, the range OMR3 corresponds to a radial range (or an area) in which the read head 15R can be arranged to read the track TRm. In FIG. 20, the area on the outside from the range OMR3 and the area on the inside from the range OMR3 correspond to a radial area in which the read head 15R cannot be arranged to read the track TRm.

FIG. 20 shows a change ERLtb1 in error rate with respect to the radial position of the read head 15R1 in a case where the track TRm is read at each radial position in the radial direction from the track center TRCm by the read head 15R1, a change ERLtb2 in error rate with respect to the radial position of the read head 15R1 in a case where the track TR is read at each radial position in the radial direction from the track center TRCm by the read head 15R2, and a change ERLcb1 in error rate obtained by combining the change ERLtb1 in error rate and the change ERLtb2 in error rate. The change ERLcb1 in error rate in FIG. 20 shows a point Pof5 having the error rate threshold ER1 at the radial position RPof5 and a point Pof6 having the error rate threshold ER1 at the radial position RPof6. FIG. 20 shows a center point Phf3 of the straight line connecting the points Pof5 and Pof6.

In the example illustrated in FIG. 20, an MPU 60 arranges the read head (main read head) 15R1 at the target write radial position RPwm and writes the track TRm with the write head 15W arranged at the target write head radial position RPmm.

In the example illustrated in FIG. 20, the MPU 60 arranges the read head 15R1 at each radial position positioned in the radial direction from the target read radial position RPmm, measures or detects the error rate at each radial position, and measures or detects the radial positions RPof5 and RPof6 at which the error rate becomes the error rate threshold ER1. For example, the MPU 60 calculates the correction read radial position RPoc3 corresponding to the center of the range OMR3 of the radial positions RPof5 and RPof6 based on the radial positions RPof5 and RPof6. The MPU 60 may calculate the correction offset amount based on the radial position RPwm and the radial position RPoc3. The MPU 60 may record the correction offset amount or the correction read radial position RPoc3 associated with information of a particular sector, a particular track, or the like as a table in a particular recording area such as the system area 10b of the disk 10, the volatile memory 70, the non-volatile memory 80, and the buffer memory 90.

In the example illustrated in FIG. 20, in the case of non-vibration detection, the MPU 60 arranges the read head 15R1 at the target read radial position RPmm and reads a particular sector or a particular track.

In the example illustrated in FIG. 20, in the case of vibration detection, the MPU 60 arranges the read head 15R1 at the correction read radial position RPoc3 and reads a particular sector or a particular track. In this case, a radial range where the error rate is equal to or less than the error rate threshold ER1 in a case where the read heads 15R1 and 15R2 read with swinging in the outer direction in the case of vibration detection can be the same as a radial range where the error rate is equal to or less than the error rate threshold ER1 in a case where the read heads 15R1 and 15R2 read with swinging in the inner direction in the case of vibration detection.

Figure 21:
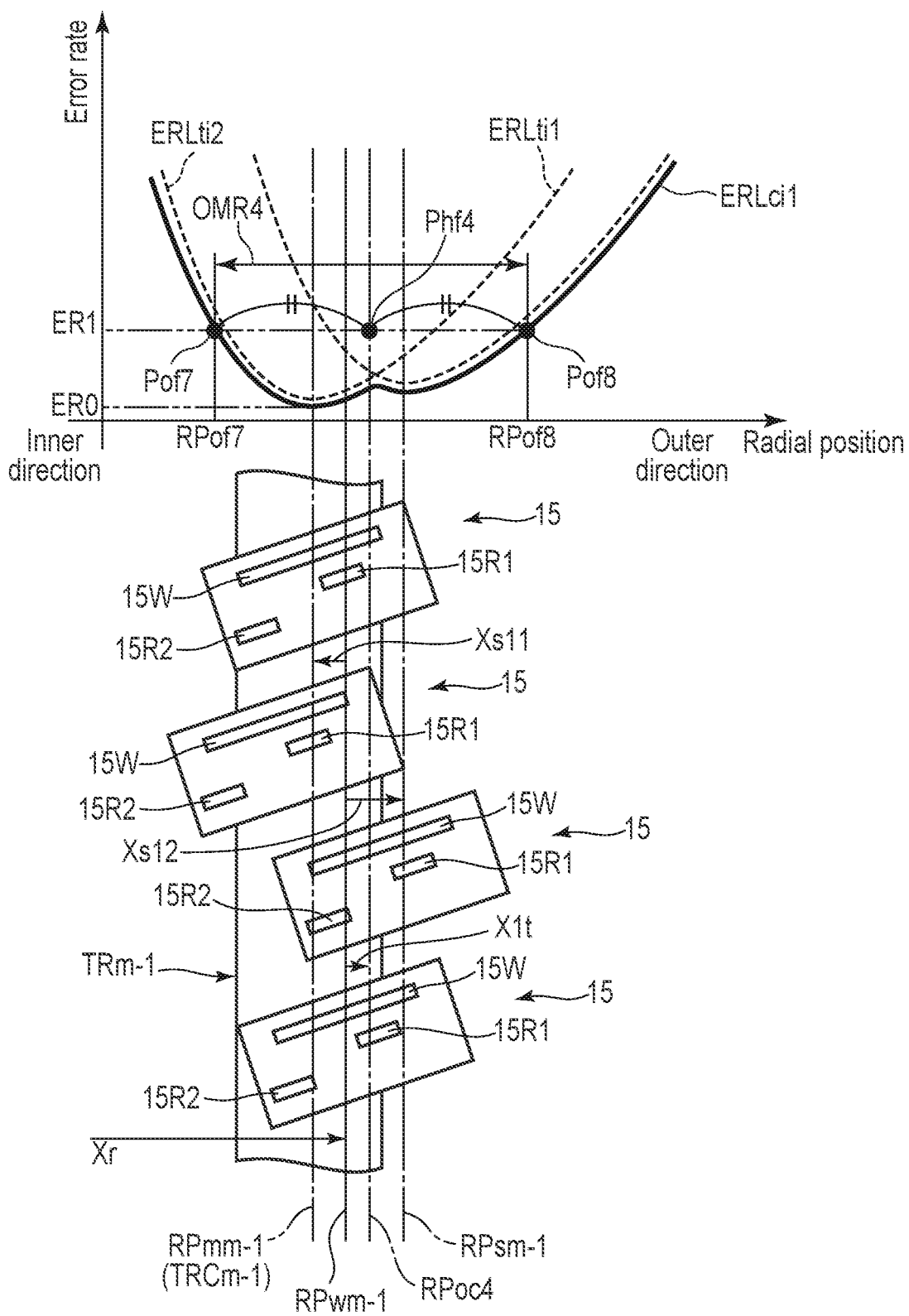
FIG. 21 is a schematic view illustrating an example of a change in error rate with respect to the radial position in a case where the read head is arranged at the correction read radial position with the head tilted at a particular skew angle according to the third embodiment.

FIG. 21 is a schematic view illustrating an example of a change ERLci1 in error rate with respect to the radial position in a case where the read head 15R1 is arranged at a correction read radial position RPoc4 with the head 15 tilted at a particular skew angle according to the third embodiment. FIG. 21 shows a track TRm−1. The horizontal axis of FIG. 21 represents radial positions RPof7, RPmm−1, RPwm−1, RPoc4, RPsm−1, and RPof8. The radial position RPmm−1 is positioned on the outside from radial position RPof5, the radial position RPwm−1 is positioned on the outside from radial position RPmm−1, the radial position RPoc4 is positioned on the outside from radial position RPwm−1, the radial position RPsm−1 is positioned on the outside from the radial position RPoc4, and the radial position RPof8 is positioned on the outside from the radial position RPsm−1. The radial position RPmm−1 corresponds to a track center TRCm−1 of the track TRm−1. The radial position RPmm−1 corresponds to the target write head radial position. The radial position RPmm−1 corresponds to the target read radial position. The radial position RPoc4 corresponds to the correction read radial position. The radial position RPwm−1 corresponds to the target write radial position which is the target read head radial position of the read head 15R1 for positioning the write head 15W at the radial position RPmm−1. The radial position RPmm−1 corresponds to the radial position offset (or displaced) in the inner direction by an offset amount Xs11 from the radial position RPwm−1. The radial position RPoc4 corresponds to a radial position offset (or displaced) in the outer direction by an offset amount X1t from the radial position RPwm−1. The radial position RPsm−1 corresponds to a radial position offset (or displaced) in the outer direction by an offset amount Xs12 from the radial position RPwm−1. FIG. 21 illustrates a range OMR4 centered on the radial position RPoc4 from the radial position RPof7 to the radial position RPof8. In FIG. 21, a distance from the radial position RPof7 to the radial position RPoc4 and a distance from the radial position RPoc4 to the radial position RPof8 are the same. Incidentally, the distance from the radial position RPof7 to the radial position RPoc4 may be different from the distance from the radial position RPoc4 to the radial position RPof8. The range OMR4 corresponds to a radial range in which the error rate in a case where the read head 15R is arranged and reads the track TRm−1 becomes equal to or less than the error rate threshold ER1. In other words, the range OMR4 corresponds to a radial range (or an area) in which the read head 15R can be arranged to read the track TRm−1. In FIG. 21, the area on the outside from the range OMR4 and the area on the inside from the range OMR4 correspond to a radial area in which the read head 15R cannot be arranged to read the track TRm−1.

FIG. 21 shows a change ERLti1 in error rate with respect to the radial position of the read head 15R1 in a case where the track TRm−1 is read at each radial position in the radial direction from the track center TRCm−1 by the read head (main read head) 15R1, a change ERLti2 in error rate with respect to the radial position of the read head 15R1 in a case where the track TRm−1 is read at each radial position in the radial direction from the track center TRCm−1 by the read head 15R2, and a change ERLci1 in error rate obtained by combining the change ERLti1 in error rate and the change ERLti2 in error rate. The change ERLci1 in error rate in FIG. 21 shows a point Pof7 having the error rate threshold ER1 at the radial position RPof7 and a point Pof8 having the error rate threshold ER1 at the radial position RPof8. FIG. 21 shows a center point Phf4 of the straight line connecting the points Pof7 and Pof8.

In the example illustrated in FIG. 21, the MPU 60 arranges the read head (main read head) 15R1 at the target write radial position RPwm−1 with the head 15 tilted at a particular skew angle in the inner direction and writes the track TRm−1 with the write head 15W arranged at the target write head radial position RPmm−1.

In the example illustrated in FIG. 21, the MPU 60 arranges the read head 15R1 at each radial position positioned in the radial direction from the target read radial position RPmm−1, measures or detects the error rate at each radial position, and measures or detects the radial positions RPof7 and RPof8 at which the error rate becomes the error rate threshold ER1. For example, the MPU 60 calculates the correction read radial position RPoc4 corresponding to the center of the range OMR4 of the radial positions RPof7 and RPof8 based on the radial positions RPof7 and RPof8. The MPU 60 may calculate the correction offset amount based on the radial position RPwm−1 and the radial position RPoc4. The MPU 60 may record the correction offset amount or the correction read radial position RPoc4 associated with information of a particular sector, a particular track, or the like as a table in a particular recording area such as the system area 10b of the disk 10, the volatile memory 70, the non-volatile memory 80, and the buffer memory 90.

In the example illustrated in FIG. 21, in the case of non-vibration detection, the MPU 60 arranges the read head 15R1 at the target read radial position RPmm−1 and reads a particular sector or a particular track.

In the example illustrated in FIG. 21, in the case of vibration detection, the MPU 60 arranges the read head 15R1 at the correction read radial position RPoc4 and reads a particular sector or a particular track. In this case, a radial range where the error rate is equal to or less than the error rate threshold ER1 in a case where the read heads 15R1 and 15R2 read with swinging in the outer direction in the case of vibration detection can be the same as a radial range where the error rate is equal to or less than the error rate threshold ER1 in a case where the read heads 15R1 and 15R2 read with swinging in the inner direction in the case of vibration detection. Incidentally, in the example illustrated in FIG. 21, a case is described in which the head 15 is tilted at a particular skew angle in the inner direction, but the same description may be applied to a case where the head 15 is tilted at a particular skew angle in the outer direction.

According to the third embodiment, the magnetic disk device 1 positions the main read head 15R1 at the correction read radial position in the case of vibration detection and executes the read processing. Further, the magnetic disk device 1 positions the main read head 15R1 at the target read radial position in the case of non-vibration detection and executes the read processing. Therefore, the magnetic disk device 1 can improve a read performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
    a disk;
    a head that has a write head that writes data to the disk and a read head that reads data from the disk; and
    a controller that changes an offset amount during read processing according to a detection state of a vibration applied by a disturbance.
2. The magnetic disk device according to claim 1, wherein, in a case where the vibration is not detected during the read processing, the controller arranges the read head at a first position where a first track is readable at a smallest first error rate and reads the first track.

3. The magnetic disk device according to claim 2, wherein, in a case where the vibration is detected during the read processing, the controller arranges the read head at a second position different from the first position and reads the first track.

4. The magnetic disk device according to claim 3, wherein the second position corresponds to a position intermediate between two boundary positions of a radial area where the first track is readable and a radial area where the first track is not readable.

5. The magnetic disk device according to claim 2, wherein, in a case where the vibration is detected when a first sector in the first track is written, the controller records first information indicating detection of the vibration in the first sector to a recording area of the disk.

6. The magnetic disk device according to claim 5, wherein, in a case where the first information is not detectable when the recording area is read, the controller arranges the read head at a first position where the first sector is readable at the first error rate and reads the first sector.

7. The magnetic disk device according to claim 6, wherein, in a case where the first information is detected when the recording area is read, the controller arranges the read head at a second position different from the first position and reads the first sector.

8. The magnetic disk device according to claim 7, wherein the second position corresponds to a position intermediate between two boundary positions of a radial area where the first sector is readable and a radial area where the first sector is not readable.

9. The magnetic disk device according to claim 1, wherein
the read head has a first read head which is a reference for positioning during read processing and a second read head which is different from the first read head, and
in a case where the vibration is not detected when a recording area of the disk is read, the controller arranges the first read head at a first position where a first track is readable at a smallest first error rate and reads the first track.

10. The magnetic disk device according to claim 9, wherein, in a case where the vibration is detected when the recording area is read, the controller arranges the first read head at a second position different from the first position and reads the first track.

11. The magnetic disk device according to claim 10, wherein the second position corresponds to a position intermediate between two boundary positions of a radial area where the first track is readable and a radial area where the first track is not readable.

12. A read processing method for a magnetic disk device which includes a disk and a head that has a write head that writes data to the disk and a read head that reads data from the disk, the method comprising:
changing an offset amount during read processing according to a detection state of a vibration applied by a disturbance.

13. The read processing method according to claim 12, further comprising: arranging the read head at a first position where a first track is readable at a smallest first error rate and reading the first track in a case where the vibration is not detected during the read processing.

14. The read processing method according to claim 13, further comprising: arranging the read head at a second position different from the first position and reading the first track in a case where the vibration is detected during the read processing.

15. The read processing method according to claim 14, wherein the second position corresponds to a position intermediate between two boundary positions of a radial area where the first track is readable and a radial area where the first track is not readable.

16. The read processing method according to claim 13, further comprising: recording first information indicating detection of the vibration in a first sector in the first track to a recording area of the disk in a case where the vibration is detected when the first sector is written.

17. The read processing method according to claim 16, further comprising: arranging the read head at a first position where the first sector is readable at the first error rate and reading the first sector in a case where the first information is not detectable when the recording area is read.

18. The read processing method according to claim 17, further comprising: arranging the read head at a second position different from the first position and reading the first sector in a case where the first information is detected when the recording area is read.

19. The read processing method according to claim 18, wherein the second position corresponds to a position intermediate between two boundary positions of a radial area where the first sector is readable and a radial area where the first sector is not readable.

20. The read processing method according to claim 12, wherein
the read head has a first read head which is a reference for positioning during read processing and a second read head which is different from the first read head, and
the method further comprises: arranging the first read head at a first position where a first track is readable at a smallest first error rate and reading the first track in a case where the vibration is not detected when a recording area of the disk is read.

* * * * *